United States Patent
Saimi et al.

(10) Patent No.: US 6,738,324 B2
(45) Date of Patent: May 18, 2004

(54) RECORDING AND/OR REPRODUCTION APPARATUS

(75) Inventors: Tatsuo Saimi, Osaka (JP); Teruhiro Shiono, Osaka (JP); Hiroaki Yamamoto, Hyogo (JP)

(73) Assignee: Matsushita Electric Industrial Co., Kadoma (JP)

(*) Notice: Subject to any disclaimer, the term of this patent is extended or adjusted under 35 U.S.C. 154(b) by 232 days.

(21) Appl. No.: 10/152,210

(22) Filed: May 20, 2002

(65) Prior Publication Data

US 2002/0181352 A1 Dec. 5, 2002

(30) Foreign Application Priority Data

May 29, 2001 (JP) .................................... 2001-161473

(51) Int. Cl.[7] ................................................ G11B 7/00
(52) U.S. Cl. ................... 369/44.37; 369/44.23; 369/112.08; 369/112.23
(58) Field of Search ................. 369/44.12, 44.23, 369/44.27, 44.37, 112.01, 112.08, 112.1, 112.13, 112.15, 112.2, 112.23, 112.26

(56) References Cited

U.S. PATENT DOCUMENTS

| | | | |
|---|---|---|---|
| 5,477,526 A | * 12/1995 | Inoue | 369/275.4 |
| 5,644,413 A | * 7/1997 | Komma et al. | 369/44.23 |
| 6,172,779 B1 | * 1/2001 | Takahashi et al. | 359/16 |

* cited by examiner

Primary Examiner—Muhammad Edun
(74) Attorney, Agent, or Firm—Renner, Otto, Boisselle & Sklar, LLP

(57) ABSTRACT

A recording and/or reproduction apparatus, for an information medium including a substrate having concave and convex portions and a plurality of recording layers, includes a light source for emitting a light beam; an optical system for diffracting the light beam emitted by the light source so as to output a first diffracted light beam and a plurality of second diffracted light beams; and a driving section for driving the optical system. The optical system outputs the first diffracted light beam and the second diffracted light beams, such that when one of the second diffracted light beams is converged to and reflected by one of the concave and convex portions, the first diffracted light beam is converged to one of the recording layers. The driving section drives the optical system, such that the one of the second diffracted light beams is converged to the one of the concave and convex portions.

42 Claims, 10 Drawing Sheets

RECORDING AND/OR REPRODUCTION APPARATUS

BACKGROUND OF THE INVENTION

1. Field of the Invention

The present invention relates to a recording and/or reproduction apparatus (information disc apparatus) for recording information to an optical disc having a plurality of recording layers or reproducing information from such an optical disc. In particular, the present invention relates to a tracking control technology and a focusing control technology usable for such a recording and/or reproduction apparatus.

2. Description of the Related Art

Conventional optical discs include a recording layer formed of a phase change material, a magneto-optical material, or a colorant, which is used for recording or reproduction of information. Usually, conventional optical discs include a single recording layer. In order to increase the recording capacity, three-dimensional recording or provision of multiple recording layers have been proposed.

With reference to FIG. 8, a conventional representative recording system will be described. An information disc apparatus 700 for recording information to or reproducing information from an optical disc 727 includes a light source 725 and an objective lens 726. The optical disc 727 includes a substrate 728. The substrate 728 has concaves portions 722 and convex portions 723 formed alternately. The optical disc 727 further includes a recording layer 720 provided in close contact with the concave portions 722 and the convex portions 723.

The light source 725 emits a light beam 724. The objective lens 726 converges the light beam 724 to one of the concave portions 722 or one of the convex portions 723 (in the example shown in FIG. 8, one of the concave portions 722). The information disc apparatus 700 detects a servo signal based on the light beam 724 reflected by the concave portion 722 or the convex portion 723, and performs focusing control and tracking control of the light beam 724 based on the servo signal.

With the combination of the information disc apparatus 700 and the optical disc 727, information can be recorded or reproduced with one light beam 724, but the information can be recorded only to one recording layer 720. Three-dimensional recording is impossible.

Referring to FIG. 9, Japanese Laid-Open Publication No. 61-248231 discloses a method for converging two different light beams emitted by two light sources to a guide track of an optical disc and a recording layer, respectively.

An information disc apparatus 800, described in Japanese Laid-Open Publication No. 61-248231, for recording information to or reproducing information from an optical disc 830 includes two light sources 827 and 828, and an objective lens 831. The optical disc 830 includes a substrate 832. The substrate 832 has concaves portions 822 and convex portions 823 formed alternately. The optical disc 830 further includes an intermediate layer 833 provided on the substrate 832 and a recording layer 834 provided on the intermediate layer 833.

The light source 828 emits a light beam 825. The objective lens 831 converges the light beam 825 to the recording layer 834. On the recording layer 834 which is away from the concave portions 822 and the convex portions 823 by a prescribed distance, information is recorded by the light beam 825.

The light source 827 also emits a light beam 824 having a different wavelength from that of the light beam 825. The objective lens 831 converges the light beam 824 to one of the concave portions 822 or one of the convex portions 823 (in the example shown in FIG. 9, one of the convex portions 823). Based on the light beam 824 converged to and reflected by the concave portion 822 or the convex portion 823, the focusing control and tracking control of the light beam 825 are performed.

The information disc apparatus 800 generates a servo signal based on the light beam 824 reflected by the convex portion 823 and performs focusing control and tracking control of the light beam 825 based on the servo signal.

Japanese Laid-Open Publication No. 61-248231 discloses that the range of selection of the material of the recording layer 834 is widened by the method shown in FIG. 9. However, information can be recorded only to one recording layer 834. Japanese Laid-Open Publication No. 61-248231 does not disclose an optical disc having a plurality of recording layers or describe recording of information to the plurality of recording layers.

The information disc apparatus 800 requires two types of light sources in order to emit two light beams having different wavelengths, and thus needs a complicated structure. In addition, it is difficult to maintain the offset amount of the two light beams 824 and 825 at a prescribed value. Therefore, a change in the relative positions of the light paths of the light beams 824 and 825 causes off-tracking or defocusing.

SUMMARY OF THE INVENTION

According to one aspect of the invention, a recording and/or reproduction apparatus for an information medium including a substrate having concave and convex portions and a plurality of recording layers is provided. The recording and/or reproduction apparatus includes a light source for emitting a light beam; an optical system for diffracting the light beam emitted by the light source so as to output a first diffracted light beam and a plurality of second diffracted light beams; and a driving section for driving the optical system. The optical system outputs the first diffracted light beam and the plurality of second diffracted light beams, such that when one of the plurality of second diffracted light beams is converged to and reflected by one of the concave and convex portions, the first diffracted light beam is converged to one of the plurality of recording layers. The driving section drives the optical system, such that the one of the plurality of second diffracted light beams is converged to the one of the concave and convex portions.

In one embodiment of the invention, the number of the plurality of second diffracted light beams and the number of the plurality of recording layers are each M, where M is an integer equal to or greater than 2. The first diffracted light beam is converged to an N'th recording layer, among the M recording layers, by the driving section driving the optical system such that an N'th second diffracted light beam, among the M second diffracted light beams, is converged to the one of concave and convex portions, where N is an integer equal to or greater than 1 but equal to or less than M.

In one embodiment of the invention, M is an integer equal to or less than 10.

In one embodiment of the invention, the number of the plurality of second diffracted light beams is equal to the number of the plurality of recording layers.

In one embodiment of the invention, information is recorded to the one of the plurality of recording layers by the first diffracted light beam being converged to the one of the plurality of recording layers.

In one embodiment of the invention, the information medium further includes at least one intermediately layer provided between the plurality of recording layers.

In one embodiment of the invention, a straight line connecting a convergence point of the first diffracted light beam and a convergence point of each of the plurality of second diffracted light beams is substantially vertical to a surface of the plurality of recording layers.

In one embodiment of the invention, the first diffracted light beam has a light amount which is larger than a light amount of each of the plurality of second diffracted light beams.

In one embodiment of the invention, the optical system includes a collimator lens for converting the light beam emitted by the light source to a parallel light beam, an optical element for diffracting the parallel light beam so as to output the first diffracted light beam and the plurality of second diffracted light beams, and an objective lens for converging the first diffracted light beam and the plurality of second diffracted light beams.

In one embodiment of the invention, the recording and/or reproduction apparatus further includes a light detection section for detecting the one of the plurality of second diffracted light beams which has been reflected by the one of the concave and convex portions and generating a first detection signal, and a signal generation section for generating a tracking control signal based on the first detection signal. The driving section drives the optical system based on the tracking control signal.

In one embodiment of the invention, the light detection section detects the first diffracted light beam reflected by the one of the plurality of recording layers and generates a second detection signal. The recording and/or reproduction apparatus further comprises a reproduction signal generation section for generating a reproduction signal based on the second detection signal.

In one embodiment of the invention, the information medium includes a protective plate provided opposite to the substrate with respect to the plurality of recording layers. The first diffracted light beam is converged to the one of the plurality of recording layers after passing through the protective plate.

In one embodiment of the invention, the recording and/or reproduction apparatus further includes a recording section for outputting a recording current for recording information to the plurality of recording layers. The light source emits the light beam based on the recording current.

In one embodiment of the invention, the optical system further includes a splitter for reflecting the first diffracted light beam reflected by the one of the plurality of recording layers and the one of the plurality of second diffracted light beams which has been reflected by the one of the concave and convex portions, and a collecting lens for collecting the first diffracted light beam and the one of the plurality of second diffracted light beams which have been reflected by the splitter.

In one embodiment of the invention, the optical element includes a volume hologram.

In one embodiment of the invention, the optical element includes a fresnel zone plate.

In one embodiment of the invention, the optical system further outputs a plurality of third diffracted light beams, such that when the one of the plurality of second diffracted light beams and one of the plurality of third diffracted light beams are converged to and reflected by the one of the concave and convex portions, the first diffracted light beam is converged to the one of the plurality of recording layers.

In one embodiment of the invention, at least either the concave portions or the convex portions have a pit for representing information.

According to another aspect of the invention, a recording and/or reproduction apparatus for an information medium including a substrate having concave and convex portions and a recording layer having a plurality of recording planes is provided. The recording and/or reproduction apparatus includes a light source for emitting a light beam; an optical system for diffracting the light beam emitted by the light source so as to output a first diffracted light beam and a plurality of second diffracted light beams; and a driving section for driving the optical system. The optical system outputs the first diffracted light beam and the plurality of second diffracted light beams, such that when one of the plurality of second diffracted light beams is converged to and reflected by one of the concave and convex portions, the first diffracted light beam is converged to one of the plurality of recording planes. The driving section drives the optical system, such that the one of the plurality of second diffracted light beams is converged to the one of the concave and convex portions.

In one embodiment of the invention, the number of the plurality of second diffracted light beams and the number of the plurality of recording planes are each M, where M is an integer equal to or greater than 2. The first diffracted light beam is converged to an N'th recording plane, among the M recording planes, by the driving section driving the optical system such that an N'th second diffracted light beam, among the M second diffracted light beams, is converged to the one of concave and convex portions, where N is an integer equal to or greater than 1 but equal to or less than M.

In one embodiment of the invention, M is an integer equal to or less than 10.

In one embodiment of the invention, the number of the plurality of second diffracted light beams is equal to the number of the plurality of recording planes.

In one embodiment of the invention, information is recorded to the one of the plurality of recording planes by the first diffracted light beam being converged to the one of the plurality of recording planes.

In one embodiment of the invention, a straight line connecting a convergence point of the first diffracted light beam and a convergence point of each of the plurality of second diffracted light beams is substantially vertical to the plurality of recording planes.

In one embodiment of the invention, the first diffracted light beam has a light amount which is larger than a light amount of each of the plurality of second diffracted light beams.

In one embodiment of the invention, at least either the concave portions or the convex portions have a pit for representing information.

According to still another aspect of the invention, a recording and/or reproduction apparatus for an information medium including a plurality of substrates and a plurality of recording layers is provided. The plurality of substrates each have concave and convex portions; the plurality of recording layers each have a plurality of recording planes; and at least one of the plurality of substrates is provided between the plurality of recording layers. The recording and/or reproduction apparatus includes a light source for emitting a light beam; an optical system for diffracting the light beam emitted by the light source so as to output a first diffracted light beam and a plurality of second diffracted light beams; and a driving section for driving the optical system. The optical system outputs the first diffracted light beam and the plurality of second diffracted light beams, such that when one of the plurality of second diffracted light beams is converged to and reflected by one of the concave and convex portions of one of the plurality of substrates, the first diffracted light beam is converged to one of the plurality of recording planes of one of the plurality of recording layers. The driving section drives the optical system, such that the one of the plurality of second diffracted light beams is converged to the one of the concave and convex portions.

In one embodiment of the invention, the number of the plurality of second diffracted light beams is M, where M is an integer equal to or greater than 2. The number of the plurality of recording planes of each of the plurality of recording layers is M. The first diffracted light beam is converged to an N'th recording plane, among the M recording planes of the one of the plurality of recording layers, by the driving section driving the optical system such that an N'th second diffracted light beam, among the M second diffracted light beams, is converged to the one of concave and convex portions of the one of the substrates, where N is an integer equal to or greater than 1 but equal to or less than M.

In one embodiment of the invention, M is an integer equal to or less than 10.

In one embodiment of the invention, a total number of the plurality of recording planes is a number obtained by multiplying the number of the plurality of second diffracted light beams by an integer.

In one embodiment of the invention, information is recorded to the one of the plurality of recording planes by the first diffracted light beam being converged to the one of the plurality of recording planes.

In one embodiment of the invention, a straight line connecting a convergence point of the first diffracted light beam and a convergence point of each of the plurality of second diffracted light beams is substantially vertical to the plurality of recording planes.

In one embodiment of the invention, the first diffracted light beam has a light amount which is larger than a light amount of each of the plurality of second diffracted light beams.

In one embodiment of the invention, at least either the concave portions or the convex portions have a pit for representing information.

According to still another aspect of the invention, a recording and/or reproduction apparatus for an information medium including a plurality of substrates and a plurality of recording layers is provided. The plurality of substrates each have concave and convex portions; and at least one of the plurality of substrates is provided between the plurality of recording layers. The recording and/or reproduction apparatus includes a light source for emitting a light beam; an optical system for diffracting the light beam emitted by the light source so as to output a first diffracted light beam and a plurality of second diffracted light beams; and a driving section for driving the optical system. The optical system outputs the first diffracted light beam and the plurality of second diffracted light beams, such that when one of the plurality of second diffracted light beams is converged to and reflected by one of the concave and convex portions of one of the plurality of substrates, the first diffracted light beam is converged to one of the plurality of recording layers. The driving section drives the optical system, such that the one of the plurality of second diffracted light beams is converged to the one of the concave and convex portions.

In one embodiment of the invention, the number of the plurality of second diffracted light beams is M, where M is an integer equal to or greater than 2. The plurality of recording layers are divided into a plurality of groups. The plurality of groups each include M recording layers. The first diffracted light beam is converged to an N'th recording layer, among the M recording planes of one of the plurality of groups, by the driving section driving the optical system such that an N'th second diffracted light beam, among the M second diffracted light beams, is converged to the one of concave and convex portions of the one of the substrates, where N is an integer equal to or greater than 1 but equal to or less than M.

In one embodiment of the invention, M is an integer equal to or less than 10.

In one embodiment of the invention, a total number of the plurality of recording layers is a number obtained by multiplying the number of the plurality of second diffracted light beams by an integer.

In one embodiment of the invention, information is recorded to the one of the plurality of recording layers by the first diffracted light beam being converged to the one of the plurality of recording layers.

In one embodiment of the invention, a straight line connecting a convergence point of the first diffracted light beam and a convergence point of each of the plurality of second diffracted light beams is substantially vertical to a surface of the plurality of recording layers.

In one embodiment of the invention, the first diffracted light beam has a light amount which is larger than a light amount of each of the plurality of second diffracted light beams.

In one embodiment of the invention, at least either the concave portions or the convex portions have a pit for representing information.

Thus, the invention described herein makes possible the advantages of providing (1) a recording and/or reproduction apparatus for performing focusing control and tracking control of a light beam at a high level of precision when used for recording information to or reproducing information from an information disc having a plurality of recording layers or a plurality of recording planes; (2) a recording and/or reproduction apparatus for performing focusing control and tracking control of a light beam at a high level of precision with a simple structure; and (3) a recording and/or reproduction apparatus for avoiding occurrence of off-tracking or defocusing of a light beam.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings. It should be noted that the present invention is not limited to the following examples but encompasses various possible examples within the scope of the claims.

EXAMPLE 1

Figure 1:
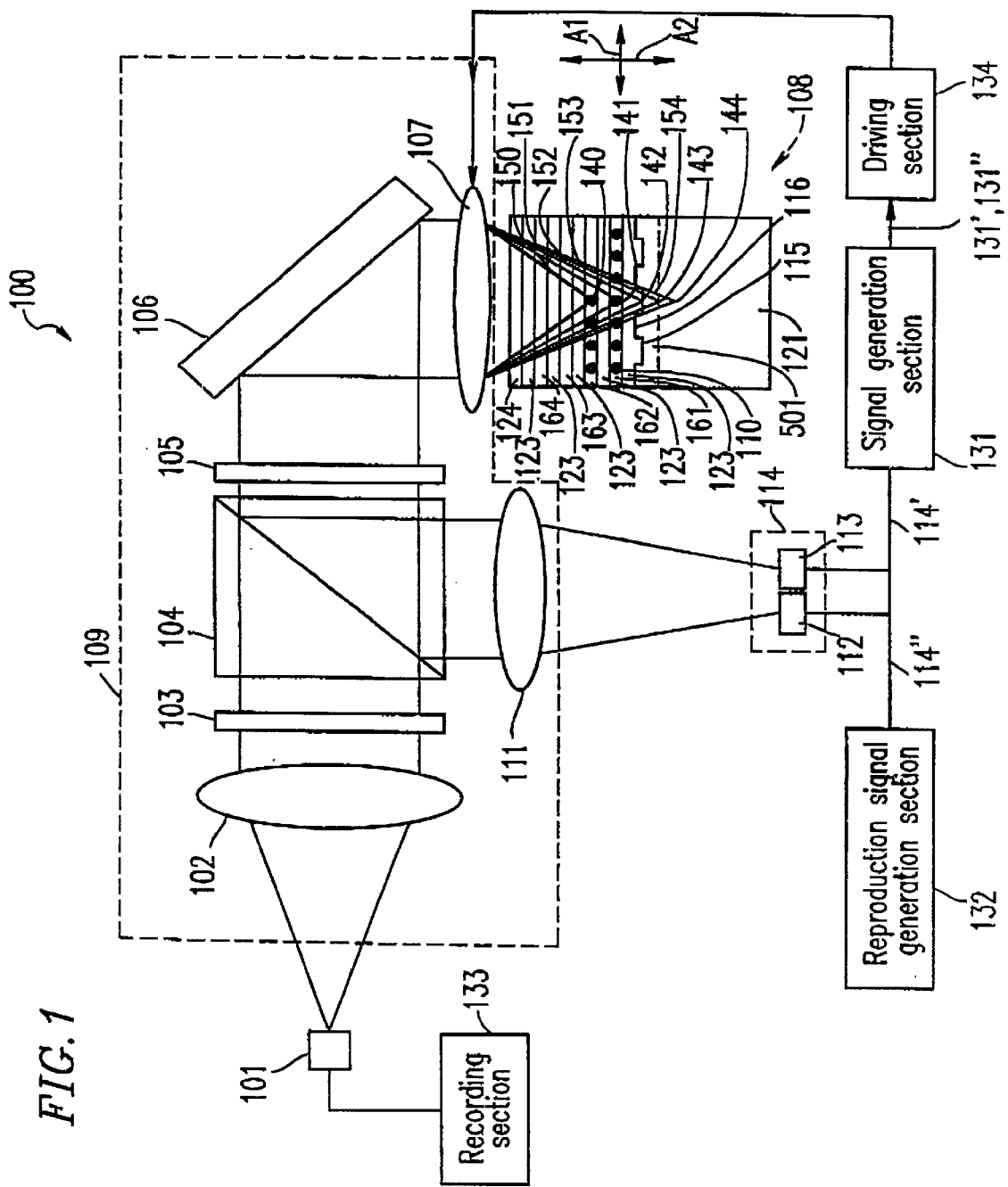
FIG. 1 is a block diagram illustrating an exemplary structure of an information disc apparatus according to the present invention.

FIG. 1 is a schematic diagram of an information disc apparatus 100 according to a first example of the present invention. The information disc apparatus 100 at least either records information to or reproduces information from a multi-layer optical disc 108, which is an information medium. The multi-layer optical disc 108 includes a substrate 121 having concave portions 115 and convex portions 116, a plurality of recording layers 161. 162, 163 and 164, and intermediate layers 123 respectively provided between the plurality of recording layers 161, 162, 163 and 164.

The information disc apparatus 100 includes a light source 101 for emitting light; an optical system 109 for diffracting the light emitted by the light source 101 so as to generate a first diffracted light beam 150 and a plurality of second diffracted light beams 151, 152, 153 and 154; a driving section 134 for driving the optical system 109, an optical detection section 114; a signal generation section 131; a reproduction signal generation section 132; and a recording section 133.

The light source 101 may be a semiconductor laser device. The optical system 109 includes a collimator lens 102 for converting the light emitted by the light source 101 into parallel light; an optical element 103 for diffracting the parallel light so as to generate the first diffracted light beam 150 and the plurality of second diffracted light beams 151, 152, 153 and 154; a ¼-wave plate 105; a reflective mirror 106; and an objective lens 107 for converging the first diffracted light beam 150 and the plurality of second diffracted light beams 151, 152, 153 and 154.

The optical system 109 outputs the first diffracted light beam 150 and the second diffracted light beams 151 through 154, such that when one of the second diffracted light beams 151 through 154 is converged to and reflected by one of the concave and convex portions 115 and 116, the first diffracted light beam 150 is converged to one of the recording-layers 161 through 164.

The optical system 109 further includes a beam splitter 104. The beam splitter 104 reflects the first diffracted light beam 150 which has been reflected by one of the recording layers 161 through 164. The beam splitter 104 also reflects one of the second diffracted light beams 151 through 154 which has been reflected by one of the concave and convex portions 115 and 116. The optical system 109 further includes a collecting lens 111 for collecting the first diffracted light beam 150 reflected by the beam splitter 104 and one of the second diffracted light beams 151 through 154 also reflected by the beam splitter 104.

For recording or reproducing information, the light detection section 114 detects one of the second diffracted light beams 151 through 154 which has been reflected by one of the concave and convex portions 115 and 116, and generates a first detection signal 114'. The signal generation section 131 generates a tracking control signal 131' and a focusing control section 131" based on the first detection signal.

For reproducing information, the light detection section 114 detects the first diffracted light beam 150 which has been reflected by a desired recording layer among the recording layers 161 through 164, and generates a second detection signal 114". The reproduction signal generation section 132 generates a reproduction signal of information recorded on the desired recording layer based on the second detection signal 114".

The driving section 134 drives the optical system 109 such that one of the second diffracted light beams 151 through 154 is converged to one of the concave and convex portions 115 and 116 based on the tracking control signal 131' and the focusing control signal 131". By the convergence of one of the second diffracted light beams 151 through 154 to one of the concave and convex portions 115 and 116, the first diffracted light beam 150 is converged to one of the recording layers 161 through 164. By the convergence of the first diffracted light beam 150 to one of the recording layers 161 through 164, information is recorded to the multi-layer optical disc 108 as a recording mark 110.

In the multi-layer optical disc 108, the plurality of recording layers 161 through 164 and the plurality of intermediate layers 123 are stacked alternately on the substrate 121. The multi-layer optical disc 108 further includes a protective plate 124 provided opposite to the substrate 121 with respect to the recording layers 161 through 164 and the intermediate layers 123. The first diffracted light beam 150 is converged to one of the recording layers 161 through 164 after passing through the protective plate 124. One of the second diffracted light beams 151 through 154 is converged to one of the concave and convex portions 115 and 116 after passing through the protective plate 124.

The substrate 121 has a track groove layer 501, which has the concave portions 115 and the convex portions 116. The concave portions 115 may be continuous or intermittent grooves.

The information disc apparatus 100 is applicable to optical discs 208, 308 and 408 described below, in addition to the optical disc 108.

The recording section 133 outputs a recording current, for recording information to the plurality of recording layers 161 through 164, to the light source 101. The light source 101 emits the light beam in accordance with the recording current. The light beam emitted by the light source 101 is converted into substantially parallel light by the collimator lens 102 and is incident on the optical element 103.

The optical element 103 diffracts the light beam which has been converted to be substantially parallel, and outputs the first diffracted light beam 150 and the plurality of second diffracted light beams 151 through 154. The first diffracted light beam 150 and the plurality of second diffracted light beams 151 through 154 are transmitted through the beam splitter 104, reflected by the reflective mirror 106. and incident on the objective lens 107. Then, the first diffracted light beam 150 and the plurality of second diffracted light beams 151 through 154 are transmitted through the objective lens 107, and are incident on the multi-layer optical disc 108.

The first diffracted light beam 150 and the plurality of second diffracted light beams 151 through 154, which are incident on the multi-layer optical disc 108, are converged to different convergence points 140, 141, 142, 143 and 144, respectively. The convergence point 140 of the first diffracted light beam 150 is on one of the recording layers 161 through 164. In the example shown in FIG. 1, the convergence point 142 of the second diffracted light beam 152 is on the concave portion 115. The convergence points 140 through 144 are linearly arranged in a direction A2 which is substantially vertical to a surface direction A1 of the recording layers 161 through 164.

The second diffracted light beam 152 converged to and reflected by the concave portion 115 of the multi-layer optical disc 108 passes through the objective lens 107, is reflected by the beam splitter 104, is collected by the collecting lens 111, and is incident on the light detection section 114. The light detection section 114 is equally divided into two light detectors 112 and 113. The light detectors 112 and 113 detect the second diffracted light beam 152 incident thereon. The signal generation section 131 generates the tracking control signal 131' based on the detection result of the light detectors 112 and 113. The driving section 134 drives the objective lens 107 based on the tracking control signal 131' so as to perform tracking control.

In this example, a push-pull system is used as a tracking control system. The push-pull system is well known and will not be described in detail here. A sample servo system may be used, by which intermittent grooves or pits partially de-tracked in one direction and the opposite direction are used. This system is also well known and will not be described in detail here.

A light amount of the first diffracted light beam 150 is larger than a light amount of any of the second diffracted light beams 151 through 154. Namely, the first diffracted light beam 150 has the maximum light amount among the first diffracted light beam 150 and the second diffracted light beams 151 through 154. The ratio of the light amount of the first diffracted light beam 150 and the light amount of one of the second diffracted light beams 151 through 154 maybe, for example, 10:1 or 15:1. The first diffracted light beam 150 may be a 0'th order non-diffracted light beam which is not influenced by diffraction.

The information disc apparatus 100 performs recording or reproduction of information by converging the first diffracted light beam 150 having the maximum light amount to a desired recording layer among the recording layers 161 through 164. The information disc apparatus 100 performs tracking control by converging one of the second diffracted light beams 151 through 154 to and reflecting the one light beam by one of the concave and convex portions 115 and 116. For the tracking control, the push-pull system or the sample servo system, for example, is used.

By converging one of the second diffracted light beams 151 through 154 to one of the concave and convex portions 115 and 116, the focusing control signal 131" is obtained in a manner similar to the tracking control signal 131'. In this case also, the light detection section 114 detects the second diffracted light beam 152 which is converged to and reflected by, for example, the concave portion 115. The signal generation section 131 generates the focusing control signal 131" based on the detection result of the light detection section 114. The driving section 134 drives the objective lens 107 based on the focusing control signal 131" so as to perform focusing control.

The first diffracted light beam 150 having the maximum light amount may be used for generating the focusing control signal 131". In this case, the focusing control signal 131" is generated using the light beam for recording or reproducing information, and therefore, de-focusing tends not to occur. Consequently, the focusing depth is not too shallow even in a system having a large numerical aperture.

In the information disc apparatus 100, only the first diffracted light beam 150 is used for recording or reproduction of information, among a plurality of diffracted light beams generated from the light beam emitted by the light source 101. Therefore, the energy of the light used for recording or reproduction of information is lower than in the case where the entire light beam emitted by the light source 101 is used for recording or reproduction of information. The larger the number of diffracted light beams generated from the light beam emitted by the light source 101 is, the lower the energy of the light used for recording or reproduction of the information is. Therefore, there may be a limit in the number of the second diffracted light beams output by the optical element 103.

As the number of the recording layers corresponding to the number of the second diffracted light beams increases, the difference among the intensities of the second diffracted light beans passing through the recording layers increases, since the recording layers have different transmittances. The number of the recording layers may also be limited in order to generate the tracking control signal 131' so that the servo operation for tracking control is performed within an appropriate operation range.

The number of the second diffracted light beams 151 through 154 is equal to the number of the recording layers 161 through 164. In the example shown in FIG. 1, four second diffracted light beams 151 through 154 are used in correspondence with four recording layers 161 through 164. For practical use, the number of the second diffracted light beams and the number of the recording layers (or recording planes) is preferably equal to or less than 10.

As described above, the second diffracted light beam 151 through 154 are used for generating the tracking control signal 131', and the first diffracted light beam 150 is used for generating the focusing control signal 131". The convergence point of one of the second diffracted light beams 151 through 154 on the concave portion 115 or the convex portion 116 is away from the convergence point of the first diffracted light beam 150 (on one of the recording layers 161 through 164) by a prescribed distance. However, it is difficult to precisely maintain the distance. The reasons are: (1) the optical disc itself may have an error caused during the production: and (2) it is difficult to produce the optical element 103 so that the distance between the first diffracted light beam 150 and the second diffracted light beams 151 through 154 is precisely a prescribed value. As a result, the distance between the above-mentioned two convergence points can have an error of about 0.5 to 5 $\mu$m.

In order to generate the accurate tracking control signal 131' despite such an error, the focusing depth in the focusing direction for generating the tracking control signal 131' is increased. One method for increasing the focusing depth in the focusing direction when generating the tracking control signal 131' will be described. The pitch of the tracking control signal 131' is made double the pitch of a recording signal, and the tracking control signal 131' is shifted by a half of the pitch. The polarity of the tracking control signal 131' is switched each time the optical disc is rotated once. Thus, the focusing depth in the focusing direction-can be increased. As a result, the accurate tracking error signal 131' can be generated. This technology of increasing the focusing depth is similar to the technology used for DVD-RAM.

Another method for increasing the focusing depth in the focusing direction when generating the tracking control signal 131' will be described. By this method, the numerical aperture of the area of the objective lens 107 which generates the second diffracted light beams 151 through 154 used for generating the tracking control signal 131' is reduced. The spatial frequency response when generating the tracking control signal 131' is in inverse proportion to the numerical aperture. The focusing depth is in inverse proportion to the square of the numerical aperture. As such, when the numerical aperture is reduced to half, the focusing depth is increased by four times.

Figure 2:
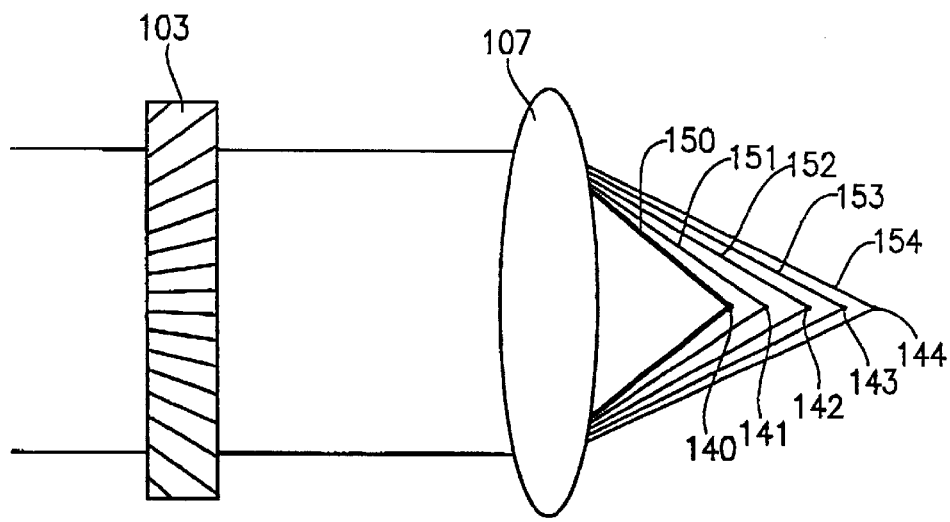
FIG. 2 shows an exemplary optical element for outputting first and second diffracted light beams according to the present invention.

Next, with reference to FIG. 2, the optical element 103 in this example will be described. As shown in FIG. 2, the optical element 103 is, for example, a thick film volume hologram. The optical element 103 generates and outputs the first diffracted light beam 150 and the second diffracted light beams 151 through 154. The first diffracted light beam 150 passes through the objective lens 107 and is converged at the first convergence point 140. The second diffracted light beams 151 through 154 pass through the objective lens 107 and are respectively converged at the second convergence points 141 through 144. As described above, the optical element 103 generates the second diffracted light beams 151 through 154 used for tracking control performed by the information disc apparatus 100. When the optical hologram 103 is a volume hologram, only the diffracted light beams in the + direction can be used as the second diffracted light beams 151 through 154. The first diffracted light beam 150 is the $0^{th}$ order diffracted light beam having the maximum intensity. The second diffracted light beams 151 through 154 are respectively +1st order through +4th order diffracted light beams. Since only the diffracted light beams in the + direction are generated, the light beam utilization factor can be improved.

Figure 3:
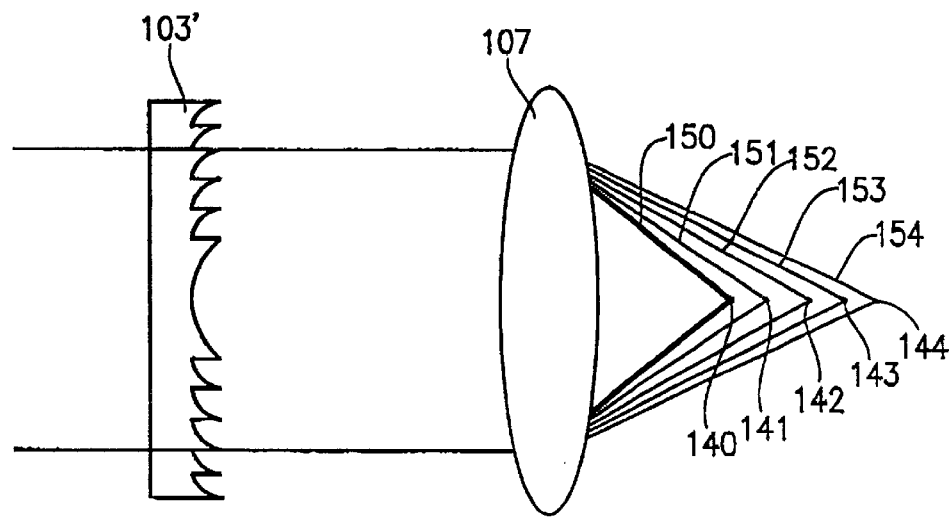
FIG. 3 shows another exemplary optical element for outputting first and second diffracted light beams according to the present invention.

Instead of the optical element 103, a diffraction element 103' may be used as shown in FIG. 3. The diffraction element 103' is fresnel zone plate-based and has a surface having concave and convex portions. The diffraction element 103' generates light beams having a constant order number, and the diffracted light beams generated have almost the same light amount. When the diffraction element 103' is used, diffracted light beams in both the + direction and the − direction are generated. When, for example, the light amount of the −2nd order diffracted light beam is maximum, the −2nd order diffracted light beam is output as the first diffracted light beam 150. As compared with the volume hologram, however, the diffraction element 103' tends to easily generate higher order diffracted light beams and thus involve a large loss in the light amount.

Figure 4A:
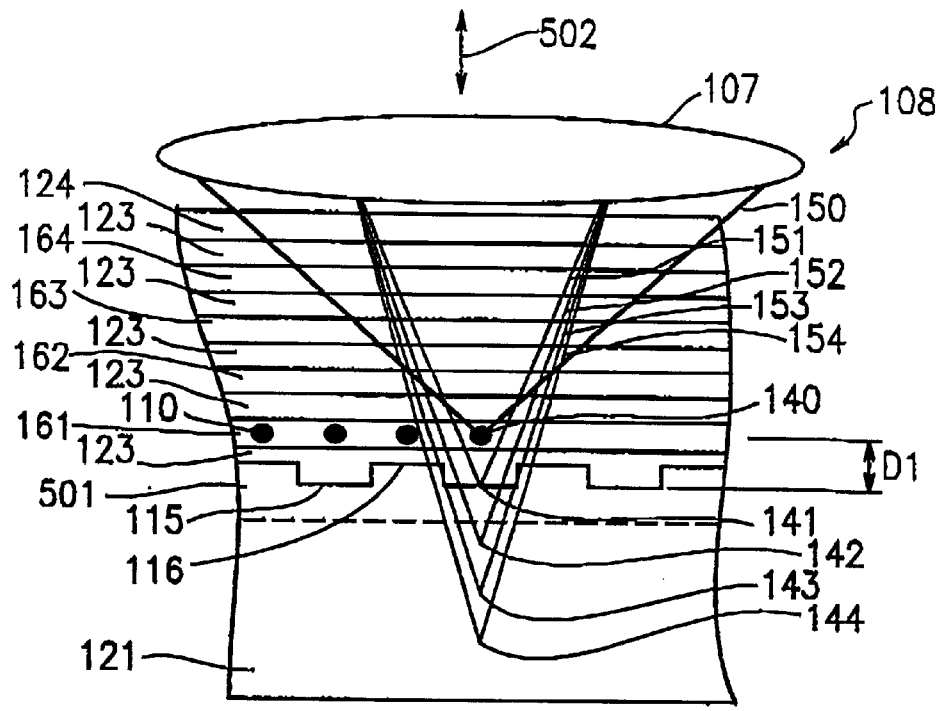
FIG. 4A shows information recording and reproduction operations including tracking control and focusing control according to a first example of the present invention.

With reference to FIG. 4A, a recording operation of information to the multi-layer optical disc 108 including tracking control will be described.

Information is recorded on one of the recording layers 161 through 164 by the first diffracted light beam 150 having the maximum light amount being converged to the one of the recording layers 161 through 164.

The driving section 134 converges, for example, the second diffracted light beam 151, among the second diffracted light beam 151 through 154, to the convergence point 141 on the concave portion 115. The light detectors 112 and 113 (FIG. 1) detect the second diffracted light beam 151 converged on the concave portion 115, and generate a detection signal 114' (FIG. 1). The signal generation section 131 generates a tracking control signal 131' and a focusing control signal 131" in accordance with the detection signal 114'. The driving section 134 controls and drives the objective lens 107 (FIG. 1) based on the tracking control signal 131' and the focusing control signal 131". By the objective lens 107 being controlled based on the tracking control signal 131' and the focusing control signal 131", the tracking position and the focusing position of the first diffracted light beam 150 output from the objective lens 107 are controlled. The tracking control may be performed with the push-pull system.

Here, it is assumed that the number of the second diffracted light beams and the number of the recording layers are each M (M is an integer equal to or greater than 2). The driving section 134 drives the optical system 109 such that an N'th diffracted light beam (N is an integer equal to or greater than 1 but equal to or less than M), among the M second diffracted light beams, is converged to one of the concave and convex portions 115 and 116. Thus, the first diffracted light beam 150 is converged to the N'th recording layer among the M recording layers. As described above, M is an integer preferably equal to or less than 10.

In the example shown in FIG. 4A, M=4. The driving section 134 drives the optical system 109 in a focusing direction 502 such that the first second diffracted light beam 151 is converged to one of the concave portions 115 (i.e., the convergence point 141 is on one of the concave portions 115). Thus, the first diffracted light beam 150 is converged to the first recording layer 161. By the convergence of the first diffracted light beam 150 to the first recording layer 161, information is recorded on the first recording layer 161. The driving section 134 may drive the entire optical system 109 or may drive at least the objective lens 107 in the optical system 109. Here, the second diffracted light beam 151 which is closest to the objective lens 107 is referred to as the "first" second diffracted light beam, and the second diffracted light beam 154 which is farthest from the objective lens 107 is referred to as the "fourth" second diffracted light beam. The recording layer 161 which is farthest from the objective lens 107 is referred to as the "first" recording layer, and the recording layer 164 which is closest to the objective lens 107 is referred to as the "fourth" recording layer.

When the driving section 134 drives the optical system 109 in the focusing direction 502 such that the second second diffracted light beam 152 is converged to one of the concave portions 115 (i.e., the convergence point 142 is on one of the concave portions 115), the first diffracted light beam 150 is converged to the second recording layer 162. By the convergence of the first diffracted light beam 10 to the second recording layer 162, information is recorded on the second recording layer 162.

When the driving section 134 drives the optical system 109 in the focusing direction 502 such that the third second diffracted light beam 153 is converged to one of the concave portions 115 (i.e., the convergence point 143 is on one of the concave portions 115), the first diffracted light beam 150 is converged to the third recording layer 163. By the convergence of the first diffracted light beam 150 to the third recording layer 163, information is recorded on the third recording layer 163.

When the driving section 134 drives the optical system 109 in the focusing direction 502 such that the fourth second diffracted light beam 154 is converged to one of the concave portions 115 (i.e., the convergence point 144 is on one of the concave portions 115), the first diffracted light beam 150 is converged to the fourth recording layer 164. By the convergence of the first diffracted light beam 150 to the fourth recording layer 164, information is recorded on the fourth recording layer 164.

An exemplary reproduction operation of information recorded on the recording layer 161 of the multi-layer optical disc 108 will be described. The driving section 134 drives the optical system 109 such that the second diffracted light beam 151 is converged to the concave portion 115. Thus, the first diffracted light beam 150 is converged to the recording layer 161. By the convergence of the first diffracted light beam 150 to the first recording layer 161, the information recorded on the first recording layer 161 is reproduced.

In order to increase the focusing depth, the numerical aperture of the area of the objective lens 107 which generates the second diffracted light beams 151 through 154 used for tracking control is made about 20% to about 50% smaller than the numerical aperture of the area of the objective lens 107 which generates the first diffracted light beam 150 used for recording of information.

In the case where the concave portions 115 and the convex portions 116 are adjacent to each of the recording layers 161 through 164, the tracking control signal 131' and the focusing control signal 131" can be obtained with the first diffracted light beam 150. Information cannot be recorded on a recording layer which is not adjacent to the concave portions 115 and the convex portions 116 with one light beam. The reason is that the tracking control signal 131' and the focusing control signal 131" cannot be obtained in such a case.

According to the information disc apparatus 100 of the present invention, information can be recorded as a recording mark 110 even on a recording layer which is not adjacent to the concave portions 115 and the convex portions 116. The reason is that the tracking control signal 131' and the focusing control signal 131" can be obtained by converging either one of the second diffracted light beams 151 through 154 to one of the concave and convex portions 115 and 116. In this case, the information is recorded as a recording mark 110 at a position away from, for example, the concave portion 115 by a prescribed distance. In the example shown in FIG. 4A, the information is recorded on the recording layer 161 which is away from the concave portion 115 by distance D1, which is the distance between the convergence points 141 and 140.

The information disc apparatus 100 is not limited to the recording and reproduction apparatus, but can be a recording-dedicated apparatus or a reproduction-dedicated apparatus.

EXAMPLE 2

Figure 4B:
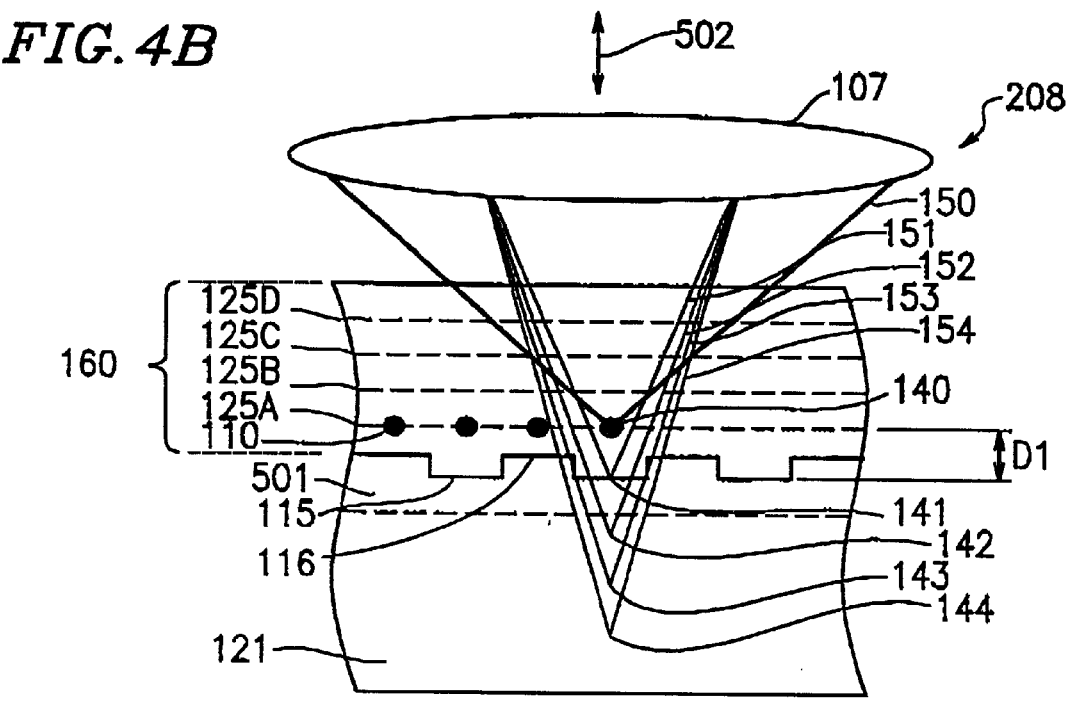
FIGS. 4B and 4C show information recording and reproduction operations including tracking control and focusing control according to a second example of the present invention.

With reference to FIG. 4B, a second example in which the information disc apparatus 100 is applied to an optical disc 208 which allows information to be recorded three-dimensionally will be described.

The optical disc 208, which is an information medium, includes a substrate 121 and a recording layer 160 provided on the substrate 121. The recording layer 160 includes a plurality of recording planes 125A, 125B, 125C and 125D which allow information to be recorded to, or to be reproduced from. Like the optical disc 108 shown in FIG. 4A, the optical disc 208 has a track groove layer 501, which has concave portions 115 and convex portions 116. A "recording plane" refers to an area which expands at a specified height in the recording layer 160. By converging the first diffracted light beam 150 at a position at this specified height, information can be recorded on or reproduced from the recording plane at that height.

Operations of recording information to and reproducing information from the optical disc 208 are basically the same as those described regarding the optical disc 108 in the first example except for the following. In the first example, the first diffracted light beam 150 having the maximum intensity is converged to one of the recording layers 161 through 164, so as to record information on the one recording layer. In the second example, the first diffracted light beam 150 is converged to one of the recording planes 125A through 125D, instead of the recording layers 161 through 164, so as to record information on the one recording plane. In this example, the number of the second diffracted light beams 151 through 154 is equal to the number of the recording planes 125A through 125D.

In the example shown in FIG. 4B, the first diffracted light beam 150 is converged to the recording plane 125A, and thus the information is recorded on the recording plane 125A. The second diffracted light beam 151 is converged to and reflected by the concave portion 115. The light detectors 112 and 113 detect the second diffracted light beam 151 reflected by the concave portion 115, and the signal generation section 131 generates a tracking control signal 131' and a focusing control signal 131" based on the detection result. The driving section 134 controls and drives the objective lens 107 based on the tracking control signal 131' and the focusing control signal 131". As a result of the objective lens 107 being controlled based on the tracking control signal 131' and the focusing control signal 131", the tracking position and the focusing position of the first diffracted light beam 150 output from the objective lens 107 are controlled. The tracking control may be performed with a push-pull system.

Although information should be recorded to one of the recording planes 125A through 125D, it is undesirably possible to record information to positions other than the recording planes 125A through 125D. When a focusing control operation or a tracking control operation becomes temporarily unstable, there is an undesirable possibility that information is recorded to a position other than the recording planes 125A through 125D, i.e., a position between the recording planes. In order to avoid this, the information disc apparatus 100 operates such that when the focusing control operation or the tracking control operation becomes temporarily unstable beyond a tolerable range, an error signal is detected from the focusing control signal or the tracking control signal, and the recording operation is temporarily stopped based on the error signal.

Figure 4C:
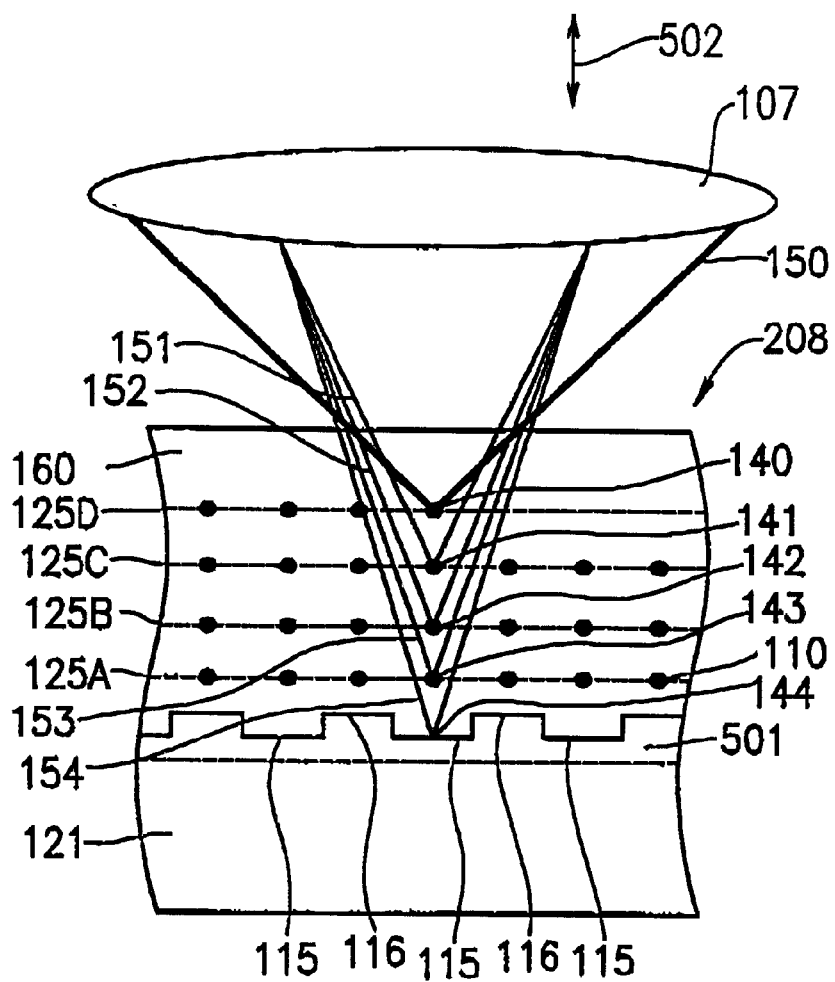

With reference to FIG. 4C, a method for recording information to the recording layers 125A through 125D of the optical disc 208 sequentially will be more specifically described.

Here, it is assumed that the number of the second diffracted light beams and the number of the recording planes are each M (M is an integer equal to or greater than 2). The driving section 134 drives the optical system 109 such that an N'th diffracted light beam (N is an integer equal to or greater than 1 but equal to or less than M), among the M second diffracted light beams, is converged to one of the concave and convex portions 115 and 116. Thus, the first diffracted light beam 150 is converged to the N'th recording plane. As described above, M is an integer preferably equal to or less than 10.

In the example shown in FIG. 4C, M=4. The driving section 134 drives the optical system 109 in the focusing direction 502 such that the fourth second diffracted light beam 154 is converged to one of the concave portions 115 (i.e., the convergence point 144 is on one of the concave portions 115). Thus, the first diffracted light beam 150 is converged to the fourth recording plane 125D. By the convergence of the first diffracted light beam 150 to the fourth recording plane 125D, information is recorded on the recording plane 125D. Here, the second diffracted light beam 151 which is closest to the objective lens 107 is referred to as the "first" second diffracted light beam, and the second diffracted light beam 154 which is farthest from the objective lens 107 is referred to as the "fourth" second diffracted light beam. The recording plane 125A which is farthest from the objective lens 107 is referred to as the "first" recording plane, and the recording plane 125D which is closest to the objective lens 107 is referred to as the "fourth" recording plane.

When the driving section 134 drives the optical system 109 in the focusing direction 502 such that the first second diffracted light beam 151 is converged to one of the concave portions 115 (i.e., the convergence point 141 is on one of the concave portions 115), the first diffracted light beam 150 is converged to the first recording plane 125A. By the convergence of the first diffracted light beam 150 to the first recording plane 125A, information is recorded on the recording plane 125A.

When the driving section 134 drives the optical system 109 in the focusing direction 502 such that the second second diffracted light beam 152 is converged to one of the concave portions 115 (i.e., the convergence point 142 is on one of the concave portions 115), the first diffracted light beam 150 is converged to the second recording plane 125B. By the convergence of the first diffracted light beam 150 to the second recording plane 125B, information is recorded on the recording plane 125B.

When the driving section 134 drives the optical system 109 in the focusing direction 502 such that the third second diffracted light beam 153 is converged to one of the concave portions 115 (i.e., the convergence point 143 is on one of the concave portions 115), the first diffracted light beam 150 is converged to the third recording plane 125C. By the convergence of the first diffracted light beam 150 to the third recording plane 125C, information is recorded on the recording plane 125C.

An exemplary reproduction operation of information recorded on the recording plane 125D of the optical disc 208 will be described. The driving section 134 drives the optical system 109 such that the second diffracted light beam 154 is converged to the concave portion 115. Thus, the first diffracted light beam 150 is converged to the fourth recording plane 125D. By the convergence of the first diffracted light beam 150 to the fourth recording plane 125D, the information recorded on the fourth recording plane 125D is reproduced.

As described above, the plurality of second diffracted light beams 151 through 154 are sequentially converged to the concave portion 115 so as to generate the tracking control signal 131' and the focusing control signal 131". Thus, information is recorded on the recording layer 160 by the first diffracted light beam 150. In this manner, information can be recorded on the four recording planes in the recording layer 160.

In the example shown in FIG. 4C, information is recorded both above the concave portions 115 and above the convex portions 116. It is possible to record information either above the concave portions 115 or above the convex portions 116. This reduces the information recording density to half, but is effective in the case where the stability of the recording or reproduction operation is more important than the recording density.

EXAMPLE 3

Figure 5A:
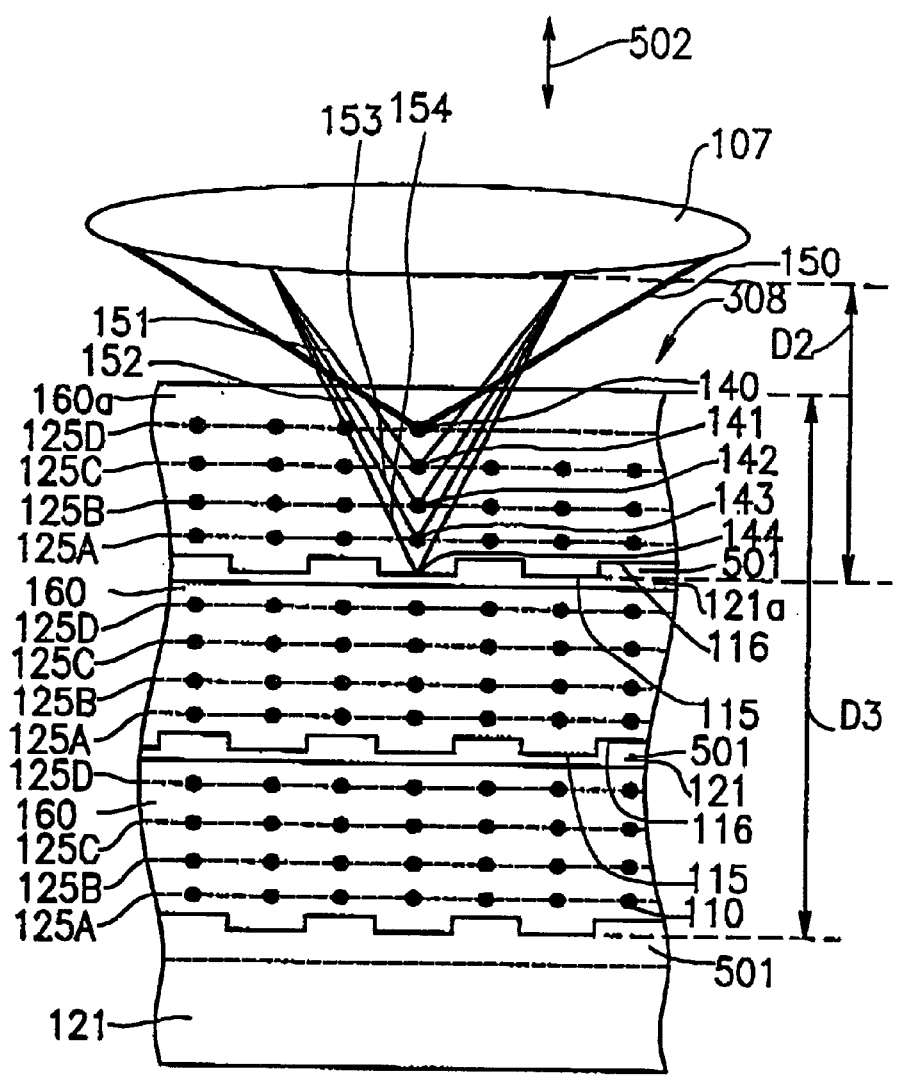
FIGS. 5A and 5B show information recording and reproduction operations including tracking control and focusing control according to a third example of the present invention.

With reference to FIG. 5A, a third example in which the information disc apparatus 100 is applied to an optical disc 308 which allows information to be recorded three-dimensionally will be described.

The optical disc 308, which is an information medium, includes a plurality of the structures of the optical disc 208 shown in FIGS. 4B and 4C, which are stacked vertically. In more detail, each of the structures includes a substrate 121 and a recording layer 160. Each recording layer 160 includes four recording planes 125A, 125B, 125C and 125D in correspondence with the number of second diffracted light beams 151 through 154. Each substrate 121 has concave portions 115 and convex portions 116. At least one substrate 121 is provided between two adjacent recording layers 160. The substrates 121 are formed of a light-transmissive material. The substrate 121 between two adjacent recording layers 160 may be thinner than the substrate 121 at the bottom of the optical disc 308. The total number of the recording planes 125A, 125B, 125C and 125D is a number obtained by multiplying the number of second diffracted light beams 151 through 154 by an integer.

In FIG. 5A, a distance D2 between the objective lens 107 and the convergence point 144 of the second diffracted light beam 154 appears to be shorter than a total thickness D3 of the optical disc 308 for the sake of explanation. However, in actuality, the distance D2 is greater than the thickness D3.

Operations of recording information to and reproducing information from the optical disc 308 are basically the same as those described regarding the optical disc 208 in the second example.

Here, it is assumed that the number of the second diffracted light beams, and the number of the recording planes in each recording layer 160, are each M (M is an integer equal to or greater than 2). The driving section 134 drives the optical system 109 such that an N'th diffracted light beam (N is an integer equal to or greater than 1 but equal to or less than M), among the M second diffracted light beams, is converged to one of the concave and convex portions 115 and 116 of one of the substrates 121. Thus, the first diffracted light beam 150 is converged to the N'th recording plane of the one substrate 121. As described above, M is an integer preferably equal to or less than 10.

For the sake of clarity, the recording layer 160 which is closest to the objective lens 107 will be referred to as the "recording layer 160a", and the substrate 121 immediately below the recording layer 160a will be referred to as the "substrate 121a".

In the example shown in FIG. 5A, M=4. The driving section 134 drives the optical system 109 in the focusing direction 502 such that the fourth second diffracted light beam 154 is converged to one of the concave portions 115

(i.e., the convergence point 144 is on one of the concave portions 115) of the substrate 121a immediately below the recording layer 160a. Thus, the first diffracted light beam 150 is converged to the fourth recording plane 125D of the recording layer 160a. By the convergence of the first diffracted light beam 150 to the fourth recording plane 125D of the recording layer 160a, information is recorded on the recording plane 125D of the recording layer 160a.

Here, the second diffracted light beam 151 which is closest to the objective lens 107 is referred to as the "first" second diffracted light beam, and the second diffracted light beam 154 which is farthest from the objective lens 107 is referred to as the "fourth" second diffracted light beam. Regarding each recording layer 160, the recording plane 125A which is farthest from the objective lens 107 is referred to as the "first" recording plane, and the recording plane 125D which is closest to the objective lens 107 is referred to as the "fourth" recording plane.

One of the second diffracted light beams 151 through 154 may be converged to one of the concave and convex portions 115 and 116 formed in the substrate 121 which is immediately above or below the recording layer 160, among the plurality of recording layers 160, on which information is to be recorded.

When the driving section 134 drives the optical system 109 in the focusing direction 502 such that the first second diffracted light beam 151 is converged to one of the concave portions 115 (i.e., the convergence point 141 is on one of the concave portions 115) of the substrate 121a, the first diffracted light beam 150 is converged to the first recording plane 125A of the recording layer 160a. By the convergence of the first diffracted light beam 150 to the first recording plane 125A of the recording layer 160a, information is recorded on the recording plane 125A of the recording layer 160a.

When the driving section 134 drives the optical system 109 in the focusing direction 502 such that the second second diffracted light beam 152 is converged to one of the concave portions 115 of the substrate 121a (i.e., the convergence point 142 is on one of the concave portions 115), the first diffracted light beam 150 is converged to the second recording plane 125B of the recording layer 160a. By the convergence of the first diffracted light beam 150 to the second recording plane 125B of the recording layer 160a, information is recorded on the recording plane 125B of the recording layer 160a.

When the driving section 134 drives the optical system 109 in the focusing direction 502 such that the third second diffracted light beam 153 is converged to one of the concave portions 115 of the substrate 121a (i.e., the convergence point 143 is on one of the concave portions 115), the first diffracted light beam 150 is converged to the third recording plane 125C of the recording layer 160a By the convergence of the first diffracted light beam 150 to the third recording plane 125C of the recording layer 160a, information is recorded on the recording plane 125C of the recording layer 160a.

An exemplary reproduction operation of information recorded on the recording plane 125D of the recording layer 160a of the optical disc 308 will be described. The driving section 134 drives the optical system 109 such that the second diffracted light beam 154 is converged to the concave portion 115 of the substrate 121a. Thus, the first diffracted light beam 150 is converged to the fourth recording plane 125D of the recording layer 160a. By the convergence of the first diffracted light beam 150 to the fourth recording plane 125D of the recording layer 160a, the information recorded on the fourth recording plane 125D of the recording layer 160a is reproduced.

In the example shown in FIG. 5A, three recording layers 160 each including four recording planes 125A through 125D and three substrates 121 are stacked alternately, so that the optical disc 308 includes 12 recording planes. In the case where the thickness D2 is sufficiently large, a greater number of recording layers 160 and substrates 121 can be provided. Where, for example, the number of second diffracted light beams is 10 and ten recording layers and ten substrates are provided, an optical disc having 100 recording planes can be obtained. The amount of information recordable to an optical disc having 100 recording planes corresponds to the amount of information recordable to 100 optical discs each having one recording plane.

Figure 5B:
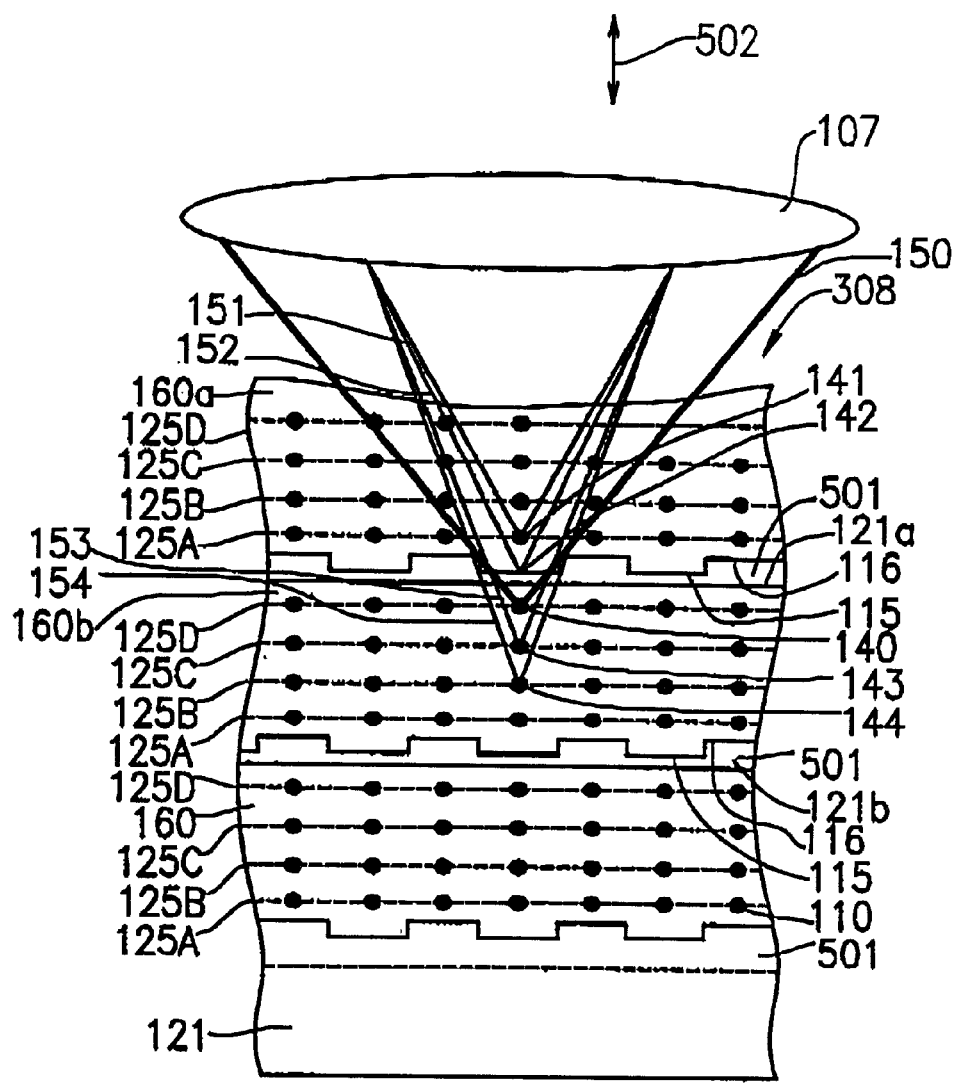

As shown in FIG. 5B, the optical system 109 may output the first diffracted light beam 150 and the second diffracted light beams 151 through 154, such that the convergence point 140 of the first diffracted light beam 150 is between the convergence points 141 and 142, between the convergence points 142 and 143, or between the convergence points 143 and 144.

For the sake of clarity, the recording layer 160 which is second closest to the objective lens 107 will be referred to as the "recording layer 160b", and the substrate 121 immediately below the recording layer 160b will be referred to as the "substrate 121b".

In the example shown in FIG. 5B, the optical system 109 outputs the first diffracted light beam 150 and the second diffracted light beams 151 through 154, such that the convergence point 140 of the first diffracted light beam 150 is between the convergence points 142 and 143. Thus, by the second diffracted light beam 152 being converged to the concave portion 115 of the substrate 121a, the first diffracted light beam 150 is converged to the recording plane 125D of the recording layer 160b.

The first diffracted light beam 150 is converged to the recording planes 125A through 125D of the recording layer 160b as follows.

By the second diffracted light beam 153 being converged to the concave portion 115 of the substrate 121b, the first diffracted light beam 150 is converged to the recording plane 125A of the recording layer 160b. By the second diffracted light beam 154 being converged to the concave portion 115 of the substrate 121b, the first diffracted light beam 150 is converged to the recording plane 125B of the recording layer 160b. By the second diffracted light beam 151 being converged to the concave portion 115 of the substrate 121a, the first diffracted light beam 150 is converged to the recording plane 125C of the recording layer 160b. By the second diffracted light beam 152 being converged to the concave portion 115 of the substrate 121a, the first diffracted light beam 150 is converged to the recording plane 125D of the recording layer 160b.

EXAMPLE 4

Figure 6:
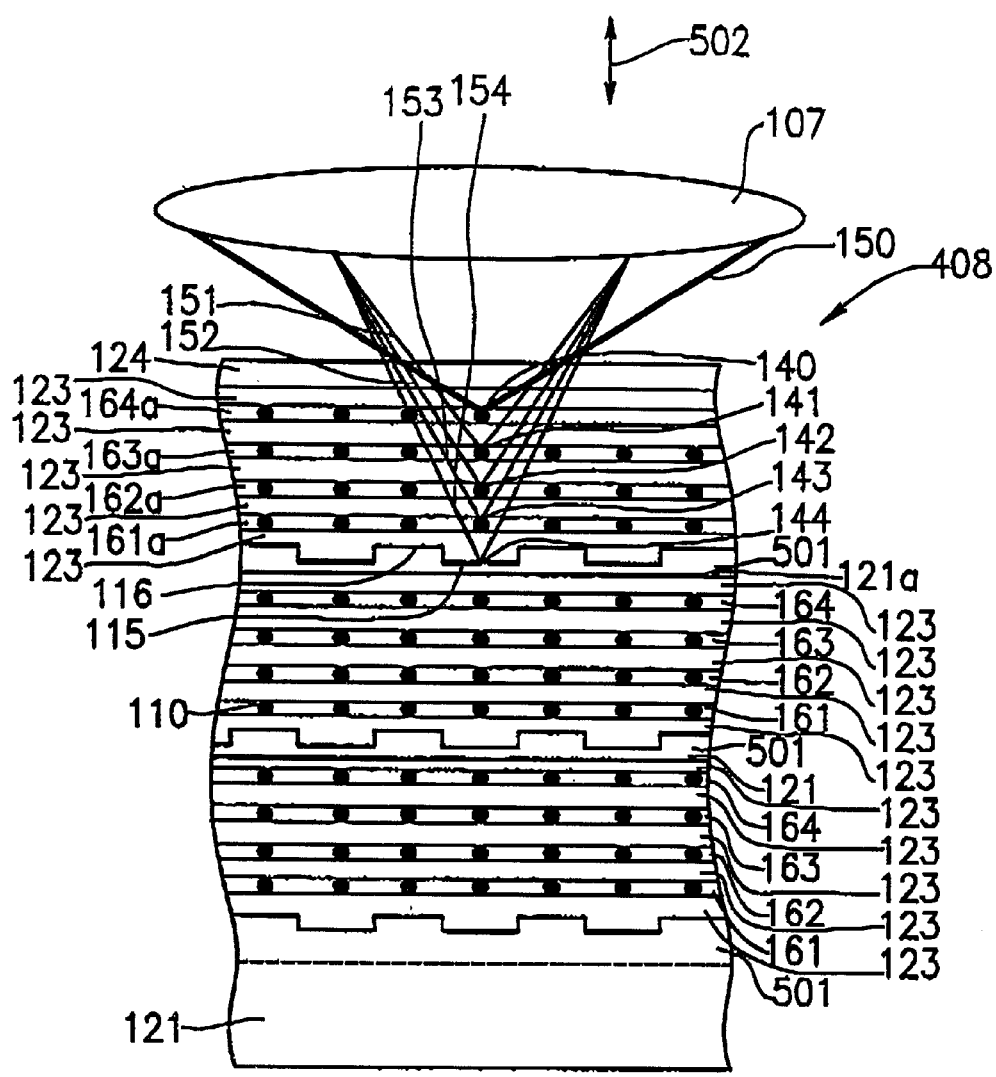
FIG. 6 shows information recording and reproduction operations including tracking control and focusing control according to a fourth example of the present invention.

With reference to FIG. 6, a fourth example in which the information disc apparatus 100 is applied to an optical disc 408 which allows information to be recorded three-dimensionally will be described.

The optical disc 408, which is an information medium, includes a plurality of the structures of the optical disc 108 shown in FIGS. 1 and 4A, which are stacked vertically. In more detail, each of the structures includes a substrate 121, a plurality of recording layers 161 through 164, and intermediate layers 123 respectively provided between the recording layers 161 through 164. The substrate 121 has a track groove layer 501, which has concave portions 115 and convex portions 116. In other words, the plurality of recording layers are divided into a plurality of groups each including a plurality of recording layers 161 through 164. At least one substrate 121 is provided between two adjacent groups of recording layers 161 through 164. The substrates 121 are formed of a light-transmissive material. The substrate 121 between two adjacent groups may be thinner than the substrate 121 at the bottom of the optical disc 408. The substrate 121 between two adjacent groups may be sufficiently thick to form the concave portions 115 and the convex portions 116. In the example shown in FIG. 6, four recording layers 161 through 164 are provided in each group in correspondence with four second diffracted light beams 151 through 154. The total number of the recording layers 161 through 164 is a number obtained by multiplying the number of second diffracted light beams 151 through 154 by an integer.

Operations of recording information to and reproducing information from the optical disc 408 are basically the same as those described regarding the optical disc 308 in the third example.

Here, it is assumed that the number of the second diffracted light beams is M (M is an integer equal to or greater than 2), and the recording layers are divided into a plurality of groups each including M recording layers. The driving section 134 drives the optical system 109 such that an N'th diffracted light beam (N is an integer equal to or greater than 1 but equal to or less than M), among the M second diffracted light beams, is converged to one of the concave and convex portions 115 and 116 of one of the substrates 121. Thus, the first diffracted light beam 150 is converged to the N'th recording layer of one of the groups. As described above, M is an integer preferably equal to or less than 10.

For the sake of clarity, the recording layers 161, 162, 163 and 164 of the group which is closest to the objective lens 107 will be referred to as the "recording layers 161a, 162a, 163a and 164a", and the substrate 121 immediately below this group will be referred to as the "substrate 121a".

In the example shown in FIG. 6, M=4. The driving section 134 drives the optical system 109 in the focusing direction 502 such that the fourth second diffracted light beam 154 is converged to one of the concave portions 115 (i.e., the convergence point 144 is on one of the concave portions 115) of the substrate 121a. Thus, the first diffracted light beam 150 is converged to the fourth recording layer 164a. By the convergence of the first diffracted light beam 150 to the fourth recording layer 164a, information is recorded on the recording layer 164a.

Here, the second diffracted light beam 151 which is closest to the objective lens 107 is referred to as the "first" second diffracted light beam, and the second diffracted light beam 154 which is farthest from the objective lens 107 is referred to as the "fourth" second diffracted light beam. Regarding each group of recording layers, the recording layer 161 which is farthest from the objective lens 107 is referred to as the "first" recording layer, and the recording layer 164 which is closest to the objective lens 107 is referred to as the "fourth" recording layer.

One of the second diffracted light beams 151 through 154 may be converged to one of the concave and convex portions 115 and 116 formed in the substrate 121 which is immediately above or below the group including the recording layer 160 on which information is to be recorded.

When the driving section 134 drives the optical system 109 in the focusing direction 502 such that the first second diffracted light beam 151 is converged to one of the concave portions 115 (i.e., the convergence point 141 is on one of the concave portions 115) of the substrate 121a, the first diffracted light beam 150 is converged to the first recording layer 161a. By the convergence of the first diffracted light beam 150 to the first recording layer 161a, information is recorded on the recording layer 161a.

When the driving section 134 drives the optical system 109 in the focusing direction 502 such that the second second diffracted light beam 152 is converged to one of the concave portions 115 of the substrate 121a (i.e., the convergence point 142 is on one of the concave portions 115), the first diffracted light beam 150 is converged to the second recording layer 162a. By the convergence of the first diffracted light beam 150 to the second recording layer 162a, information is recorded on the recording layer 162a.

When the driving section 134 drives the optical system 109 in the focusing direction 502 such that the third second diffracted light beam 153 is converged to one of the concave portions 115 of the substrate 121a (i.e., the convergence point 143 is on one of the concave portions 115), the first diffracted light beam 150 is converged to the third recording layer 163a. By the convergence of the first diffracted light beam 150 to the third recording layer 163a, information is recorded on the recording layer 163a.

An exemplary reproduction operation of information recorded on the recording layer 164a of the optical disc 408 will be described. The driving section 134 drives the optical system 109 such that the second diffracted light beam 154 is converged to the concave portion 115 of the substrate 121a. Thus, the first diffracted light beam 150 is converged to the fourth recording layer 164a. By the convergence of the first diffracted light beam 150 to the fourth recording layer 164a, the information recorded on the fourth recording layer 164a is reproduced.

As described above, there can be an error of about 0.5 to 5 µm in the distance between the convergence point of one of the second diffracted light beams 151 through 154 (i.e., the concave portion 115 or the convex portion 116) and the convergence point of the first diffracted light beam 150 (i.e., each of the recording layers 161 through 164). Therefore, the number of the recording layers cannot be as many as the number of the recording planes of the optical disc 308 shown in FIG. 5A. Even if each group can only have four recording layers, however, the total number of recording layers can be increased by stacking a plurality of groups of recording layers. For example, by stacking 10 groups of four recording layers 161 through 164, an optical disc having 40 recording layers can be obtained. The amount of information recordable to an optical disc having 40 recording layers corresponds to the amount of information recordable to 40 optical discs each having one recording layer. For example, an optical disc which has a diameter of 120 mm and includes 40 layers each having a recording capacity of 25 GB has a total recording capacity as large as 1 TB.

EXAMPLE 5

Figure 7:
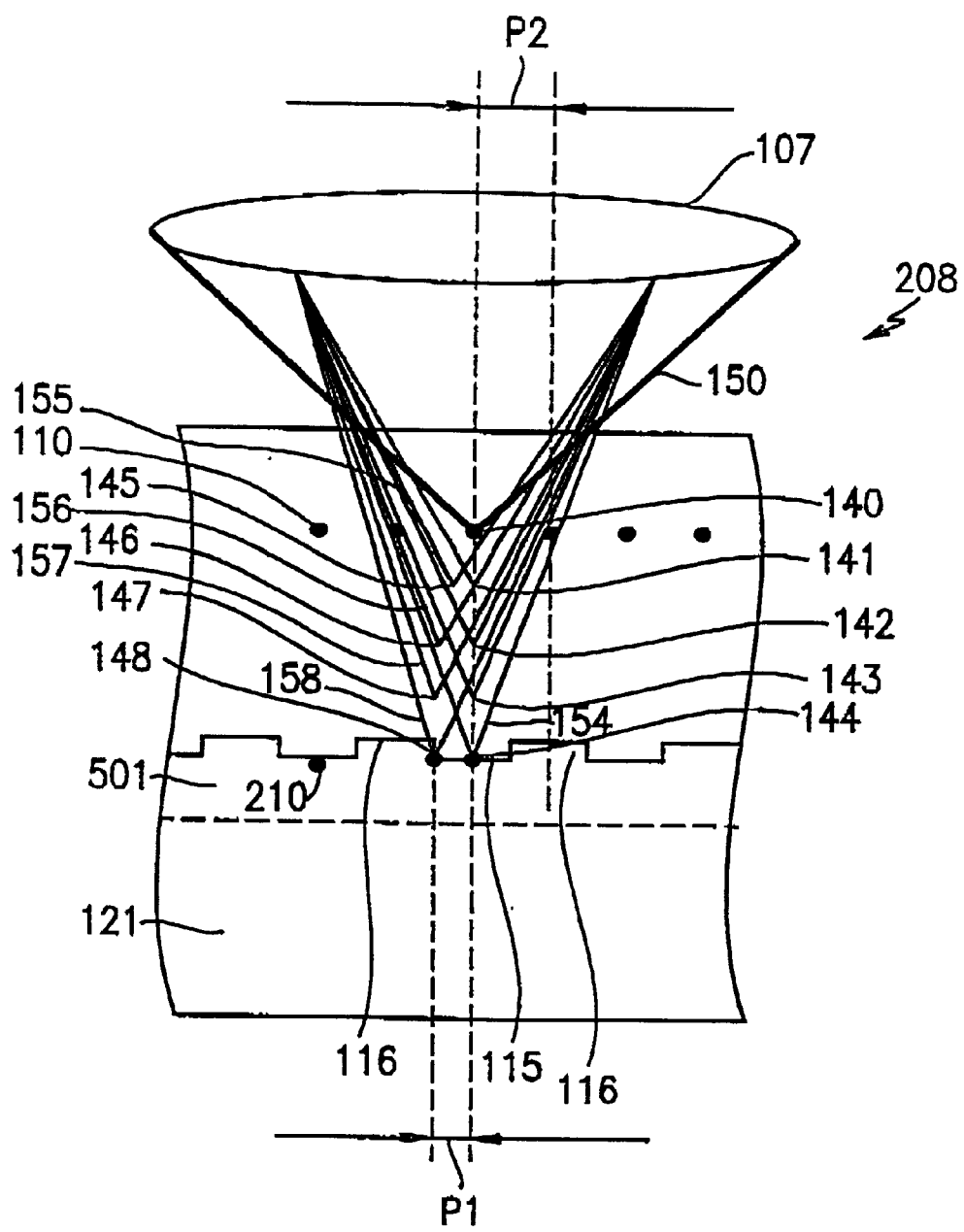
FIG. 7 shows information recording and reproduction operations including tracking control and focusing control according to a fifth example of the present invention.
Figure 8:
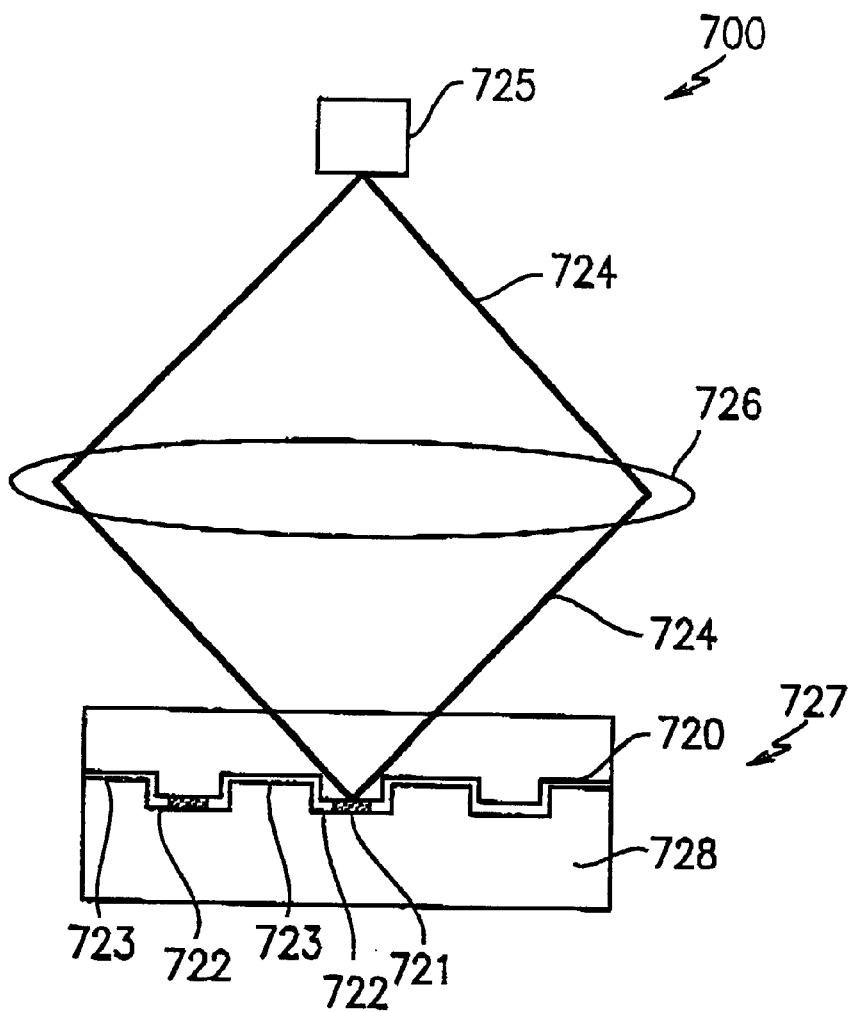
FIG. 8 shows conventional information recording and reproduction operations.
Figure 9:
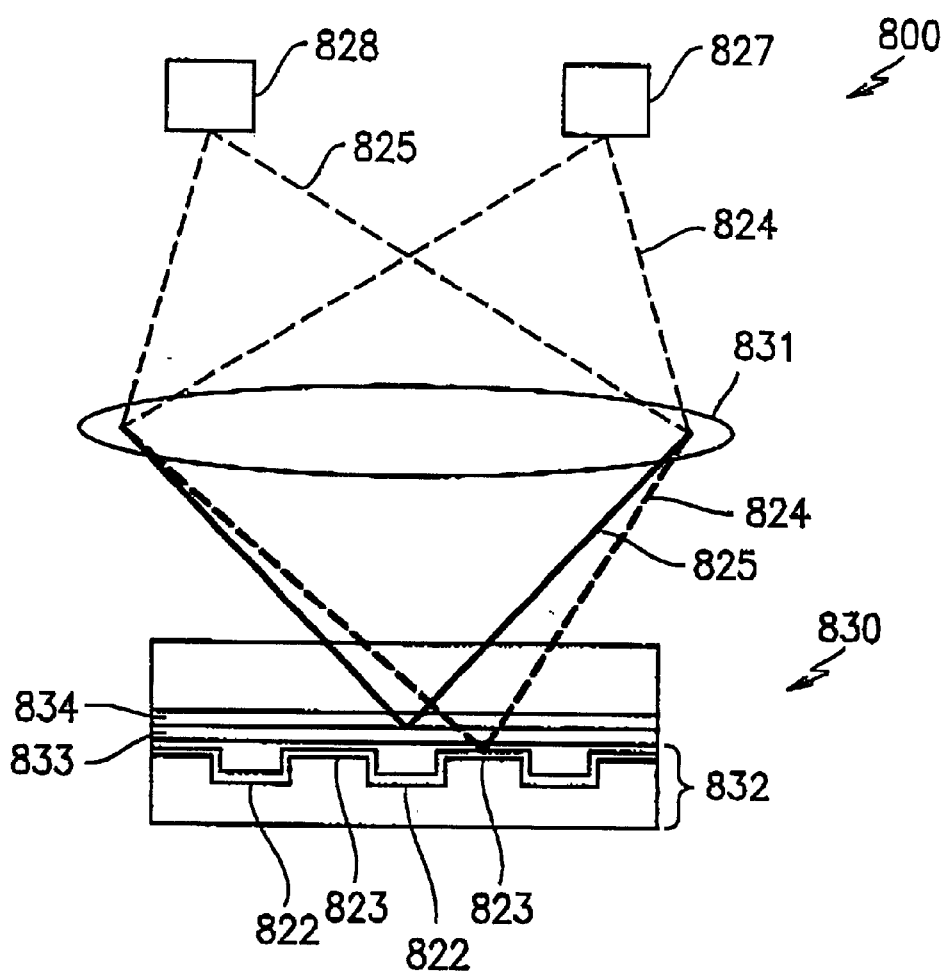
FIG. 9 shows another conventional information recording and reproduction operations.

With reference to FIG. 7, a method for making an information recording pitch shorter than a tracking control pitch will be described. The explanation will be done with the optical disc 208 in this example, but the method is applicable to the optical discs 108, 308 and 408.

The optical system 109 outputs a plurality of third diffracted light beams 155, 156, 157 and 158. Convergence points of the third diffracted light beams 155, 156, 157 and 158 are respectively represented by reference numerals 145 through 148. The straight lines respectively connecting the second diffracted light beams 151 through 154 and the convergence points 141 through 144 are in a different direction from the direction of the straight lines respectively connecting the third diffracted light beams 155 through 158 and the convergence points 145 through 148.

As shown in FIG. 7, one second diffracted light beam 154 and one third diffracted light beam 158 are converged to and reflected by one of the concave and convex portions 115 and 116. A tracking control signal 131' and a focusing control signal 131" are obtained from each of the reflected second diffracted light beam 154 and the reflected third diffracted light beam 158. A tracking pitch P1 between the second diffracted light beam 154 and the third diffracted light beam 158 is shorter than information recording pitch P2.

The phases of the obtained tracking control signals are shifted with respect to each other at a prescribed ratio, and the two signals are processed with addition or subtraction. Thus, a more precise tracking control signal 131' can be obtained. By this method, the light beam emitted by the light source 101 is divided into a larger number of second diffracted light beams. Therefore, although the energy of each diffracted light beam is smaller, the tracking control pitch P1 can be shorter. Thus, the tracking control can be performed at a higher level of precision. As shown in FIG. 7, the pitch between the convergences 141 and 145, the pitch between the convergences 142 and 146, the pitch between the convergences 143 and 147, and the pitch between the convergences 144 and 148 (each being a tracking pitch P1) are different from each other. Therefore, the shifting amount of the phase is different for each tracking control signal obtained. This slightly complicates the signal processing operation. However, the tracking control is performed within a servo controlled area and thus can be done appropriately using a DSP (digital signal processor) or the like.

With respect to the optical discs 108, 208, 308 and 408, at least either the concave portions 115 or the convex portions 116 may have a pit 210 representing ROM information as shown in FIG. 7. For recording information to or reproducing information from conventional information discs such as CD-R/W or DVD-RAM/R/RW discs, a signal for tracking control is obtained from the same plane as the plane to which information is recorded or from which information is reproduced. Therefore, where the pit for representing ROM information is formed in the concave or convex portions of such optical discs, the reproduction signal of the pit interferes with the reproduction signal of the information recorded later, thus lowering the S/N ratio of the reproduction signals. According to the present invention, the signal for tracking control is obtained from one plane (concave portions 115 or the convex portions 116), and information is recorded to or reproduced from another plane (recording layers 161, 162, 163 and 164 or the recording planes 125A, 125B, 125C and 125D). Therefore, even where the pit representing ROM information is formed in the concave or convex portions, the two types of reproduction signals do not interfere with each other. This allows the two types of reproduction signals to be used as separate signals.

As described above, according to the present invention, a light beam is divided into a plurality of second diffracted light beams 151 through 154. Each of the second diffracted light beams 151 through 154 is reflected by the concave or convex portion 115 or 116 formed in the substrate 121. A tracking control signal 131' is generated based on each of the reflected second diffracted light beams 151 through 154.

Owing to such a system, when recording information to or reproducing information from an optical disc which allows information to be recorded three-dimensionally with a first diffracted light beam, the tracking position and the focusing position of the first diffracted light beam can be controlled at a high level of precision.

In the above examples, four second diffracted light beams, or four second and four third diffracted light beams, are used. The number of the second and third diffracted light beams is not limited to these. The present invention is applicable to an optical disc having four to ten or a greater number of recording layers.

The present invention allows three-dimensional recording or reproduction of information, and thus easily increases the recording capacity of optical discs. A 12 cm-diameter optical disc having a recording density of 10 to 20 GB/inch$^2$ can have a recording capacity as large as 150 GB or more by providing four recording layers therein. When the number of recording layers is 10, a recording capacity of 400 GB or more can be obtained.

The optical discs 108, 208, 308 and 408 each may be any of a reproduction-dedicated disc, a write once type disc, or rewritable disc.

According to the present invention, an optical system outputs a first diffracted light beam and a plurality of second diffracted light beams, such that when one of the second diffracted light beams is converged to and reflected by one of concave and convex portions of the substrate, the first diffracted light beam is converged to one of a plurality of recording layers. The second diffracted light beam which is converged to and reflected by one of the concave and convex portions can be used to perform tracking control and the focusing control of an optical system. By the first diffracted light beam being converged to the one of the recording layers, information is recorded to the one of the recording layers. Owing to such a structure, to whichever recording layer the first diffracted light beam may be converged, the tracking control and the focusing control can be performed at a high level of precision.

Alternatively, an optical system outputs a first diffracted light beam and a plurality of second diffracted light beams, such that when one of the second diffracted light beams is converged to and reflected by one of concave and convex portions of the substrate, the first diffracted light beam is converged to one of a plurality of recording planes. The second diffracted light beam which is converged to and reflected by one of the concave and convex portions can be used to perform tracking control and the focusing control of an optical system. By the first diffracted light beam being converged to the one of the recording planes, information is recorded to the one of the recording planes. Owing to such a structure, to whichever recording plane the first diffracted light beam may be converged, the tracking control and the focusing control can be performed at a high level of precision.

The optical system generates a plurality of diffracted light beams by diffracting a light beam emitted by a light source. Owing to such a structure, recording, reproduction, tracking control and focusing control are all performed with one light source, instead of two as in the conventional apparatus. Therefore, the structure of the recording and/or reproduction apparatus can be simplified. Thus, the present invention provides a simple structured recording and/or reproduction apparatus for recording information to or reproducing information from an optical disc allowing information to be recorded three-dimensionally, while controlling the tracking position and focusing position of a light beam used for recording and/or reproduction at a high level of precision.

According to the present invention, the relative positions of the path of the first diffracted light beam and the paths of the second diffracted light beams do not change. Therefore, a recording and/or reproduction apparatus is provided for recording information to or reproducing information from an optical disc allowing information to be recorded three-dimensionally, while avoiding causing off-tracking or de-focusing to the light beam used for recording and/or reproduction.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A recording and/or reproduction apparatus for an information medium including a substrate having concave and convex portions and a plurality of recording layers, the recording and/or reproduction apparatus comprising:
   a light source for emitting a light beam;
   an optical system for diffracting the light beam emitted by the light source so as to output a first diffracted light beam and a plurality of second diffracted light beams; and
   a driving section for driving the optical system, wherein:
      the optical system outputs the first diffracted light beam and the plurality of second diffracted light beams, such that when one of the plurality of second diffracted light beams is converged to and reflected by one of the concave and convex portions, the first diffracted light beam is converged to one of the plurality of recording layers, and
      the driving section drives the optical system, such that the one of the plurality of second diffracted light beams is converged to the one of the concave and convex portions.

2. A recording and/or reproduction apparatus according to claim 1, wherein:
   the number of the plurality of second diffracted light beams and the number of the plurality of recording layers are each M, where M is an integer equal to or greater than 2, and
   the first diffracted light beam is converged to an N'th recording layer, among the M recording layers, by the driving section driving the optical system such that an N'th second diffracted light beam, among the M second diffracted light beams, is converged to the one of concave and convex portions, where N is an integer equal to or greater than 1 but equal to or less than M.

3. A recording and/or reproduction apparatus according to claim 2, wherein M is an integer equal to or less than 10.

4. A recording and/or reproduction apparatus according to claim 1, wherein the number of the plurality of second diffracted light beams is equal to the number of the plurality of recording layers.

5. A recording and/or reproduction apparatus according to claim 1, wherein information is recorded to the one of the plurality of recording layers by the first diffracted light beam being converged to the one of the plurality of recording layers.

6. A recording and/or reproduction apparatus according to claim 1, wherein the information medium further includes at least one intermediately layer provided between the plurality of recording layers.

7. A recording and/or reproduction apparatus according to claim 1, wherein a straight line connecting a convergence point of the first diffracted light beam and a convergence point of each of the plurality of second diffracted light beams is substantially vertical to a surface of the plurality of recording layers.

8. A recording and/or reproduction apparatus according to claim 1, wherein the first diffracted light beam has a light amount which is larger than a light amount of each of the plurality of second diffracted light beams.

9. A recording and/or reproduction apparatus according to claim 1, wherein the optical system includes:
   a collimator lens for converting the light beam emitted by the light source to a parallel light beam,
   an optical element for diffracting the parallel light beam so as to output the first diffracted light beam and the plurality of second diffracted light beams, and
   an objective lens for converging the first diffracted light beam and the plurality of second diffracted light beams.

10. A recording and/or reproduction apparatus according to claim 9, wherein the optical system further includes:
    a splitter for reflecting the first diffracted light beam reflected by the one of the plurality of recording layers and the one of the plurality of second diffracted light beams which has been reflected by the one of the concave and convex portions, and
    a collecting lens for collecting the first diffracted light beam and the one of the plurality of second diffracted light beams which have been reflected by the splitter.

11. A recording and/or reproduction apparatus according to claim 9, wherein the optical element includes a volume hologram.

12. A recording and/or reproduction apparatus according to claim 9, wherein the optical element includes a fresnel zone plate.

13. A recording and/or reproduction apparatus according to claim 1, further comprising:
    a light detection section for detecting the one of the plurality of second diffracted light beams which has been reflected by the one of the concave and convex portions and generating a first detection signal, and
    a signal generation section for generating a tracking control signal based on the first detection signal,
    wherein the driving section drives the optical system based on the tracking control signal.

14. A recording and/or reproduction apparatus according to claim 13, wherein:
    the light detection section detects the first diffracted light beam reflected by the one of the plurality of recording layers and generates a second detection signal, and
    the recording and/or reproduction apparatus further comprises a reproduction signal generation section for generating a reproduction signal based on the second detection signal.

15. A recording and/or reproduction apparatus according to claim 1, wherein:
    the information medium includes a protective plate provided opposite to the substrate with respect to the plurality of recording layers, and
    the first diffracted light beam is converged to the one of the plurality of recording layers after passing through the protective plate.

16. A recording and/or reproduction apparatus according to claim 1, further comprising a recording section for outputting a recording current for recording information to the plurality of recording layers, wherein the light source emits the light beam based on the recording current.

17. A recording and/or reproduction apparatus according to claim 1, wherein the optical system further outputs a plurality of third diffracted light beams, such that when the one of the plurality of second diffracted light beams and one of the plurality of third diffracted light beams are converged to and reflected by the one of the concave and convex portions, the first diffracted light beam is converged to the one of the plurality of recording layers.

18. A recording and/or reproduction apparatus according to claim 1, wherein at least either the concave portions or the convex portions have a pit for representing information.

19. A recording and/or reproduction apparatus for an information medium including a substrate having concave and convex portions and a recording layer having a plurality of recording planes, the recording and/or reproduction apparatus comprising:

a light source for emitting a light beam;

an optical system for diffracting the light beam emitted by the light source so as to output a first diffracted light beam and a plurality of second diffracted light beams; and a driving section for driving the optical system, wherein:
the optical system outputs the first diffracted light beam and the plurality of second diffracted light beams, such that when one of the plurality of second diffracted light beams is converged to and reflected by one of the concave and convex portions, the first diffracted light beam is converged to one of the plurality of recording planes, and the driving section drives the optical system, such that the one of the plurality of second diffracted light beams is converged to the one of the concave and convex portions.

20. A recording and/or reproduction apparatus according to claim 19, wherein:
the number of the plurality of second diffracted light beams and the number of the plurality of recording planes are each M, where M is an integer equal to or greater than 2, and the first diffracted light beam is converged to an N'th recording plane, among the M recording planes, by the driving section driving the optical system such that an N'th second diffracted light beam, among the M second diffracted light beams, is converged to the one of concave and convex portions, where N is an integer equal to or greater than 1 but equal to or less than M.

21. A recording and/or reproduction apparatus according to claim 20, wherein M is an integer equal to or less than 10.

22. A recording and/or reproduction apparatus according to claim 19, wherein the number of the plurality of second diffracted light beams is equal to the number of the plurality of recording planes.

23. A recording and/or reproduction apparatus according to claim 19, wherein information is recorded to the one of the plurality of recording planes by the first diffracted light beam being converged to the one of the plurality of recording planes.

24. A recording and/or reproduction apparatus according to claim 19, wherein a straight line connecting a convergence point of the first diffracted light beam and a convergence point of each of the plurality of second diffracted light beams is substantially vertical to the plurality of recording planes.

25. A recording and/or reproduction apparatus according to claim 19, wherein the first diffracted light beam has a light amount which is larger than a light amount of each of the plurality of second diffracted light beams.

26. A recording and/or reproduction apparatus according to claim 19, wherein at least either the concave portions or the convex portions have a pit for representing information.

27. A recording and/or reproduction apparatus for an information medium including a plurality of substrates and a plurality of recording layers, wherein the plurality of substrates each have concave and convex portions; the plurality of recording layers each have a plurality of recording planes; and at least one of the plurality of substrates is provided between the plurality of recording layers, the recording and/or reproduction apparatus comprising:

a light source for emitting a light beam;

an optical system for diffracting the light beam emitted by the light source so as to output a first diffracted light beam and a plurality of second diffracted light beams; and a driving section for driving the optical system, wherein:
the optical system outputs the first diffracted light beam and the plurality of second diffracted light beams, such that when one of the plurality of second diffracted light beams is converged to and reflected by one of the concave and convex portions of one of the plurality of substrates, the first diffracted light beam is converged to one of the plurality of recording planes of one of the plurality of recording layers, and the driving section drives the optical system, such that the one of the plurality of second diffracted light beams is converged to the one of the concave and convex portions.

28. A recording and/or reproduction apparatus according to claim 27, wherein:
the number of the plurality of second diffracted light beams is M, where M is an integer equal to or greater than 2, the number of the plurality of recording planes of each of the plurality of recording layers is M, and the first diffracted light beam is converged to an N'th recording plane, among the M recording planes of the one of the plurality of recording layers, by the driving section driving the optical system such that an N'th second diffracted light beam, among the M second diffracted light beams, is converged to the one of the concave and convex portions of the one of the substrates, where N is an integer equal to or greater than 1 but equal to or less than M.

29. A recording and/or reproduction apparatus according to claim 28, wherein M is an integer equal to or less than 10.

30. A recording and/or reproduction apparatus according to claim 27, wherein a total number of the plurality of recording planes is a number obtained by multiplying the number of the plurality of second diffracted light beams by an integer.

31. A recording and/or reproduction apparatus according to claim 27, wherein information is recorded to the one of the plurality of recording planes by the first diffracted light beam being converged to the one of the plurality of recording planes.

32. A recording and/or reproduction apparatus according to claim 27, wherein a straight line connecting a convergence point of the first diffracted light beam and a convergence point of each of the plurality of second diffracted light beams is substantially vertical to the plurality of recording planes.

33. A recording and/or reproduction apparatus according to claim 27, wherein the first diffracted light beam has a light amount which is larger than a light amount of each of the plurality of second diffracted light beams.

34. A recording and/or reproduction apparatus according to claim 27, wherein at least either the concave portions or the convex portions have a pit for representing information.

35. A recording and/or reproduction apparatus for an information medium including a plurality of substrates and a plurality of recording layers, wherein the plurality of substrates each have concave and convex portions; and at least one of the plurality of substrates is provided between the plurality of recording layers, the recording and/or reproduction apparatus comprising:

a light source for emitting a light beam;

an optical system for diffracting the light beam emitted by the light source so as to output a first diffracted light beam and a plurality of second diffracted light beams; and a driving section for driving the optical system, wherein:

the optical system outputs the first diffracted light beam and the plurality of second diffracted light beams, such that when one of the plurality of second diffracted light beams is converged to and reflected by one of the concave and convex portions of one of the plurality of substrates, the first diffracted light beam is converged to one of the plurality of recording layers, and the driving section drives the optical system, such that the one of the plurality of second diffracted light beams is converged to the one of the concave and convex portions.

36. A recording and/or reproduction apparatus according to claim 35, wherein:

the number of the plurality of second diffracted light beams is M, where M is an integer equal to or greater than 2, the plurality of recording layers are divided into a plurality of groups, the plurality of groups each include M recording layers, and the first diffracted light beam is converged to an N'th recording layer, among the M recording planes of one of the plurality of groups, by the driving section driving the optical system such that an N'th second diffracted light beam, among the M second diffracted light beams, is converged to the one of the concave and convex portions of the one of the substrates, where N is an integer equal to or greater than 1 but equal to or less than M.

37. A recording and/or reproduction apparatus according to claim 36, wherein M is an integer equal to or less than 10.

38. A recording and/or reproduction apparatus according to claim 35, wherein a total number of the plurality of recording layers is a number obtained by multiplying the number of the plurality of second diffracted light beams by an integer.

39. A recording and/or reproduction apparatus according to claim 35, wherein information is recorded to the one of the plurality of recording layers by the first diffracted light beam being converged to the one of the plurality of recording layers.

40. A recording and/or reproduction apparatus according to claim 35, wherein a straight line connecting a convergence point of the first diffracted light beam and a convergence point of each of the plurality of second diffracted light beams is substantially vertical to a surface of the plurality of recording layers.

41. A recording and/or reproduction apparatus according to claim 35, wherein the first diffracted light beam has a light amount which is larger than a light amount of each of the plurality of second diffracted light beams.

42. A recording and/or reproduction apparatus according to claim 35, wherein at least either the concave portions or the convex portions have a pit for representing information.

* * * * *

UNITED STATES PATENT AND TRADEMARK OFFICE
CERTIFICATE OF CORRECTION

PATENT NO. : 6,738,324 B2
DATED : May 18, 2004
INVENTOR(S) : Saimi et al.

It is certified that error appears in the above-identified patent and that said Letters Patent is hereby corrected as shown below:

<u>Title page,</u>
Item [73], Assignee, after Co., insert -- Ltd. --.

<u>Column 23,</u>
Line 66, "intermediately" should read -- intermediate --.

Signed and Sealed this

Tenth Day of August, 2004

JON W. DUDAS
*Acting Director of the United States Patent and Trademark Office*